(12) United States Patent
Wippermann et al.

(10) Patent No.: US 10,334,172 B2
(45) Date of Patent: Jun. 25, 2019

(54) MULTI-APERTURE IMAGING DEVICE, METHOD FOR PRODUCING THE SAME AND IMAGING SYSTEM

(71) Applicant: Fraunhofer-Gesellschaft zur Förderung der angewandten Forschung e.V., München (DE)

(72) Inventors: Frank Wippermann, Meiningen (DE); Andreas Brückner, Jena (DE); Andreas Bräuer, Schlöben (DE); Alexander Oberdörster, Jena (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 0 days.

(21) Appl. No.: 15/898,379

(22) Filed: Feb. 16, 2018

(65) Prior Publication Data

US 2018/0176472 A1 Jun. 21, 2018

Related U.S. Application Data

(63) Continuation of application No. PCT/EP2016/069645, filed on Aug. 18, 2016.

(30) Foreign Application Priority Data

Aug. 19, 2015 (DE) .......... 10 2015 215 837

(51) Int. Cl.
*G02B 7/02* (2006.01)
*G02B 7/08* (2006.01)
(Continued)

(52) U.S. Cl.
CPC ......... *H04N 5/23287* (2013.01); *G02B 7/021* (2013.01); *G02B 7/08* (2013.01);
(Continued)

(58) Field of Classification Search
CPC ............ H04N 5/23287; H04N 5/2254; H04N 5/2258; H04N 5/2259; H04N 1/0301;
(Continued)

(56) References Cited

U.S. PATENT DOCUMENTS 9,083,873 B1  7/2015 Lewkow
2004/0164224 A1*  8/2004 Harris ............... H04N 1/02409
                                                          250/208.1
(Continued)

FOREIGN PATENT DOCUMENTS

CN       104704809 A    6/2015
DE    102014213371 B3    8/2015
(Continued)

OTHER PUBLICATIONS

International Search Report dated Oct. 28, 2016 issued in related PCT App. No. PCT/EP2016/069645 (3 pages).
(Continued)

*Primary Examiner* — Nicholas G Giles
(74) *Attorney, Agent, or Firm* — Haynes and Boone, LLP

(57) ABSTRACT

A multi-aperture imaging device includes an image sensor, a single-line array of juxtaposed optical channels, wherein each optical channel includes optics for projecting a partial area of an object area on an image sensor area of the image sensor and beam deflector for deflecting an optical path of the optical channels. The multi-aperture imaging device includes an actuator unit for generating a relative movement between the image sensor, the single-line array and the beam deflector, wherein the actuator unit is arranged such that the same is arranged at least partly between two planes that are spanned by sides of a cuboid, wherein the sides of the cuboid are oriented parallel to one another as well to a line exten- (Continued)

sion direction of the single-line array and part of the optical path of the optical channels between the image sensor and the beam deflector.

30 Claims, 34 Drawing Sheets

(51) Int. Cl.
| | |
|---|---|
| *H02N 2/02* | (2006.01) |
| *G02B 13/00* | (2006.01) |
| *G02B 15/14* | (2006.01) |
| *G02B 17/00* | (2006.01) |
| *G02B 26/08* | (2006.01) |
| *G02B 27/64* | (2006.01) |
| *H04N 5/225* | (2006.01) |
| *H04N 5/232* | (2006.01) |
| *H02K 41/035* | (2006.01) |

(52) U.S. Cl.
CPC ....... *G02B 13/001* (2013.01); *G02B 13/0055* (2013.01); *G02B 15/14* (2013.01); *G02B 17/002* (2013.01); *G02B 26/0816* (2013.01); *G02B 26/0875* (2013.01); *G02B 27/646* (2013.01); *H02K 41/0356* (2013.01); *H02N 2/026* (2013.01); *H04N 5/2254* (2013.01); *H04N 5/2258* (2013.01); *H04N 5/2259* (2013.01)

(58) Field of Classification Search
CPC ...... H04N 1/0303; H04N 1/03; H04N 5/3692; G02B 7/021; G02B 7/08; G02B 13/001; G02B 13/0055; G02B 15/14; G02B 17/002; G02B 26/0816; G02B 26/0875; G02B 27/646; H02K 41/0356; H02N 2/026

See application file for complete search history.

(56) References Cited

U.S. PATENT DOCUMENTS

| | | |
|---|---|---|
| 2007/0058961 A1 | 3/2007 | Kobayashi et al. |
| 2008/0112029 A1 | 5/2008 | Bodkin |
| 2009/0122406 A1 | 5/2009 | Rouvinen et al. |
| 2014/0085393 A1* | 3/2014 | Plotkin ................ G02B 26/123 347/118 |
| 2014/0111650 A1 | 4/2014 | Georgiev et al. |
| 2015/0077623 A1 | 3/2015 | Lo et al. |
| 2015/0109468 A1 | 4/2015 | Laroia |
| 2015/0201128 A1 | 7/2015 | Dong |
| 2018/0100997 A1* | 4/2018 | Zou ..................... G02B 21/006 |

FOREIGN PATENT DOCUMENTS

| | | |
|---|---|---|
| TW | 200710552 A | 3/2007 |
| WO | WO 2015/015383 A2 | 2/2015 |
| WO | WO 2015/019772 A1 | 2/2015 |

OTHER PUBLICATIONS

International Preliminary Report on Patentability dated Nov. 23, 2017 issued in related PCT App. No. PCT/EP2016/069645 (44 pages with English translation).

* cited by examiner

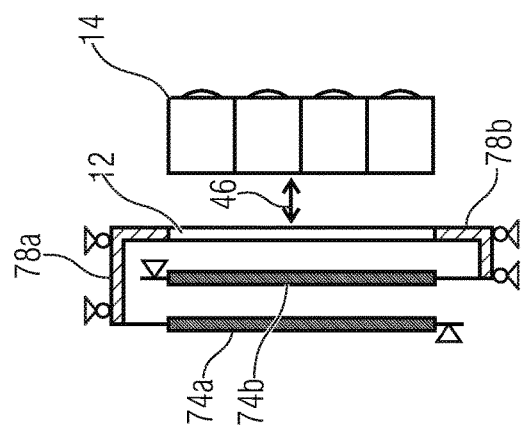
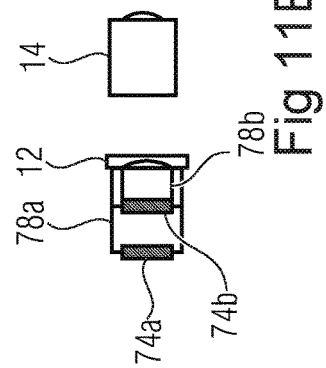
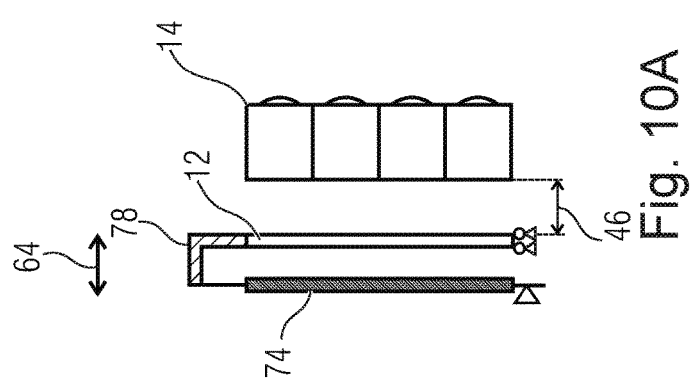
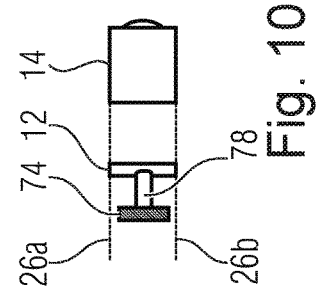

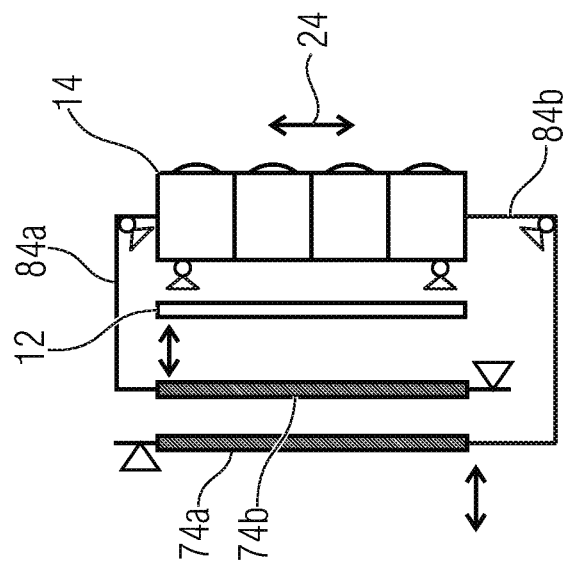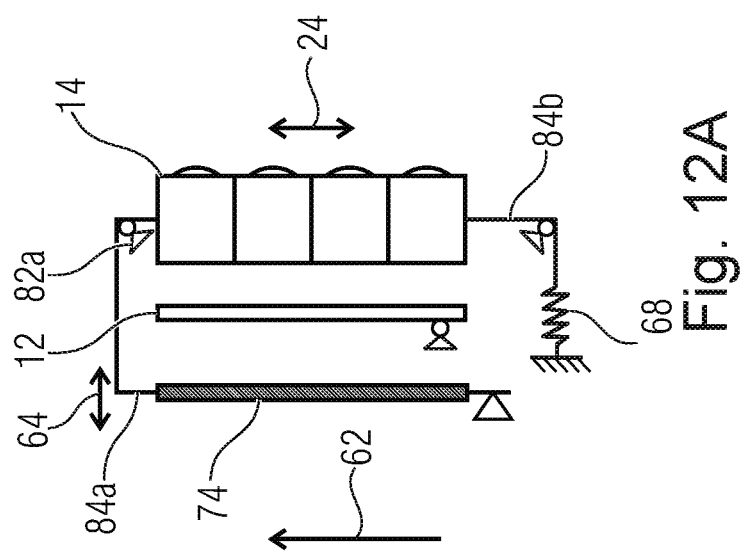

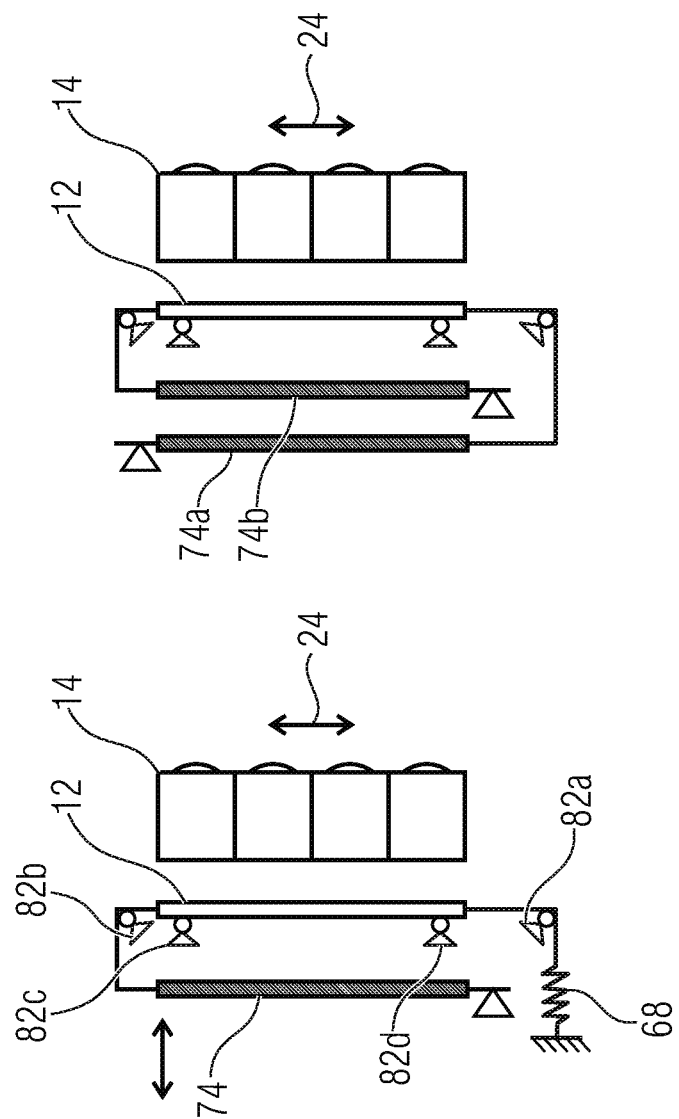

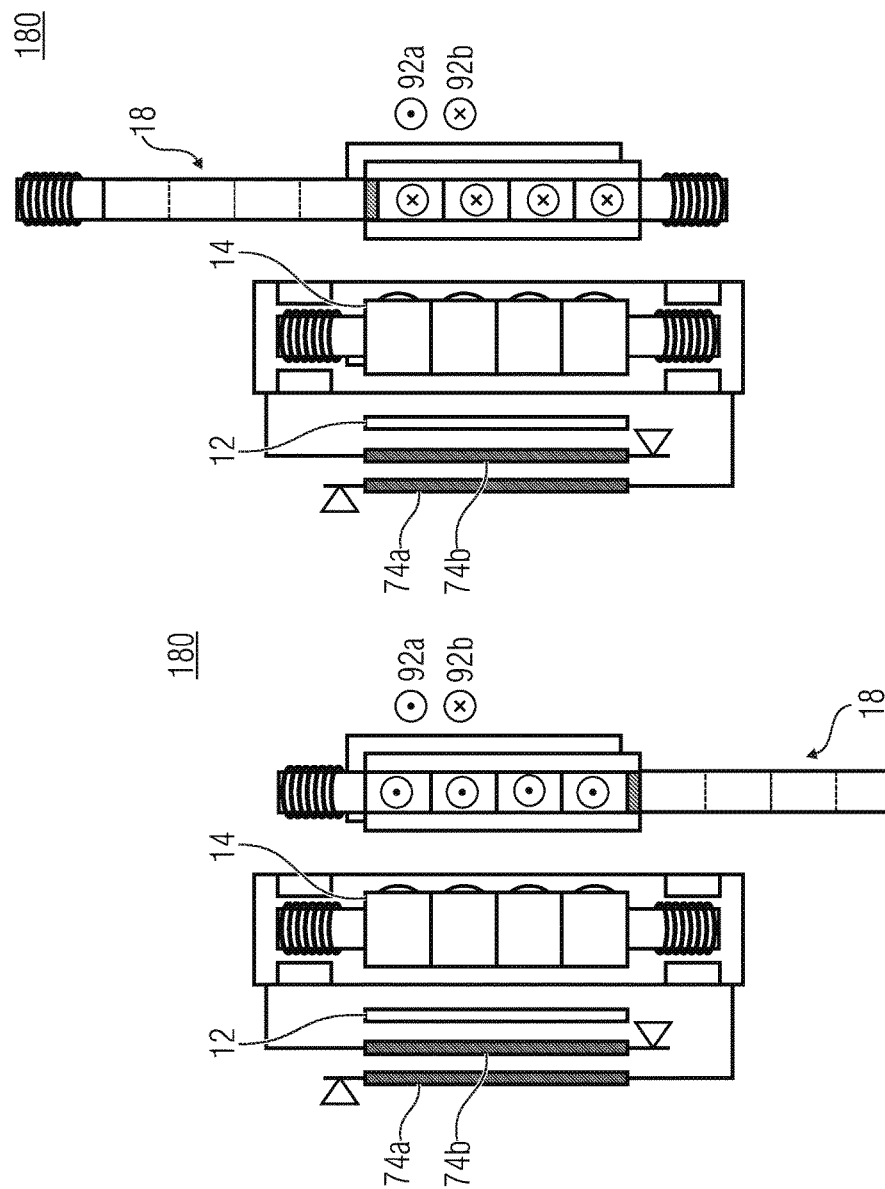

MULTI-APERTURE IMAGING DEVICE, METHOD FOR PRODUCING THE SAME AND IMAGING SYSTEM

CROSS-REFERENCE TO RELATED APPLICATIONS

This application is a continuation of co-pending International Application No. PCT/EP2016/069645, filed Aug. 18, 2016, which is incorporated herein by reference in its entirety, and additionally claims priority from German Application No. 10 2015 215 837.3, filed Aug. 19, 2015, which is also incorporated herein by reference in its entirety.

The present invention relates to a multi-aperture imaging device and to a method for producing the same. Further, the present invention relates to an imaging device and to an arrangement of components for generating movements and multi-aperture imaging systems.

BACKGROUND OF THE INVENTION

Conventional cameras have an imaging channel imaging the total object field. The cameras have adaptive components allowing adaptation of the imaging system and thereby broadening production tolerances and the operating temperature range or allowing autofocus as well as optical image stabilization functions. Components for generating movements for realizing focusing and optical image stabilization functions are arranged such that the same enclose the optical axis or the objective in directions but without blocking the imaging optical path. Cameras and/or multi-aperture imaging devices have a need for miniaturization.

Thus, a concept would be desirable which allows miniaturized multi-aperture imaging devices for capturing a total field of view while ensuring high image quality.

SUMMARY

According to an embodiment, a multi-aperture imaging device may have: an image sensor; a single-line array of juxtaposed optical channels, wherein each optical channel includes optics for projecting a partial area of an object area on an image sensor area of the image sensor, wherein the single-line array includes a carrier through which the optical channels pass; beam-deflecting means for deflecting an optical path of the optical channels; and actuator means for generating a relative movement between the image sensor, the single-line array and the beam-deflecting means, wherein the actuator means is arranged such that the same is arranged at least partly between two planes that are spanned by sides of a cuboid, wherein the sides of the cuboid are oriented parallel to one another as well as to a line extension direction of the single-line array and part of the optical path of the optical channels between the image sensor and the beam-deflecting means and its volume is at a minimum and still includes the image sensor, the single-line array and the beam-deflecting means; and wherein the multi-aperture imaging device includes a thickness direction that is arranged normal to the two planes, wherein the actuator means includes a dimension parallel to the thickness direction and a portion of at most 50% of the dimension projects beyond the two planes, starting from an area between the two planes.

Another embodiment may have an imaging system with a first inventive multi-aperture imaging device and a second inventive multi-aperture imaging device, wherein the imaging system is configured to capture an object area at least stereoscopically.

According to another embodiment, a method for producing a multi-aperture imaging device may have the steps of: providing an image sensor; arranging a single-line array of juxtaposed optical channels, such that each optical channel includes optics for projecting a partial area of an object area on an image sensor area of the image sensor, such that the single-line array includes a carrier through which the optical channels pass; arranging beam-deflecting means for deflecting an optical path of the optical channels; arranging actuator means for generating a relative movement between the image sensor, the single-line array and the beam-deflecting means, wherein the actuator means is arranged such that the same is arranged at least partly between two planes that are spanned by sides of a cuboid, wherein the sides of the cuboid are oriented parallel to one another as well as to a line extension direction of the single-line array and part of the optical path of the optical channels between the image sensor and the beam-deflecting means and its volume is at a minimum and still includes the image sensor, the single-line array and the beam-deflecting means; wherein the multi-aperture imaging device includes a thickness direction that is arranged normal to the two planes, wherein the actuator means includes a dimension parallel to the thickness direction and a portion of at most 50% of the dimension projects beyond the two planes, starting from an area between the two planes.

A core idea of the present invention is the finding that based on relative movement between a single-line array, the image sensor and the beam-deflecting means, focus and/or optical image stabilization can be obtained enabling high image quality. Arranging the actuator means in the plane of the cuboid spanned or defined by a position of the image sensor, the beam-deflecting means and the single-line array enables small installation space requirements along a direction perpendicular to this plane due to the absence of the actuator means along this direction.

According to an embodiment, a multi-aperture imaging device includes an image sensor, a single-line array of juxtaposed optical channels, wherein each optical channel includes optics for projecting a partial area of an object area on an image sensor area of the image sensor, beam-deflecting means for deflecting an optical path of the optical channels and actuator means for generating a relative movement between the image sensor, the single-line array and the beam-deflecting means. The actuator means is arranged such that the same is arranged at least partly between two planes that are spanned by sides of a cuboid, wherein the sides of the cuboid are oriented parallel to one another as well as to a line extension direction of the single-line array and part of the optical path of the optical channels between the image sensor and the beam-deflecting means and its volume is at a minimum and still includes the image sensor, the single-line array and the beam-deflecting means.

According to a further embodiment, an imaging system includes a first multi-aperture imaging device and at least a second multi-aperture imaging device and is configured to capture an object area at least stereoscopically.

According to a further embodiment, a method for producing a multi-aperture imaging device includes providing an image sensor, arranging a single-line array of juxtaposed optical channels, such that each optical channel includes optics for projecting a partial area of an object area on an image sensor area of the image sensor. The method includes arranging beam-deflecting means for deflecting an optical path of the optical channels and arranging actuator means for generating a relative movement between the image sensor, the single-line array and the beam-deflecting means. The actuator means is arranged such that the same is arranged at least partly between two planes that are spanned by sides of a cuboid, wherein the sides of the cuboid are oriented parallel to one another as well as to a line extension direction of the single-line array and part of the optical path of the optical channels between the image sensor and the beam-deflecting means and its volume is at a minimum and still includes the image sensor, the single-line array and the beam-deflecting means.

BRIEF DESCRIPTION OF THE DRAWINGS

Embodiments of the present invention will be detailed subsequently referring to the appended drawings, in which:

FIG. 10A is a schematic top view of the image sensor and the single-line array according to an embodiment, wherein a change of a distance between image sensor and array is enabled for a focus function;

FIG. 10B is a schematic side view of the image sensor and the single-line array of FIG. 10A;

FIG. 11A is a schematic top view of the image sensor and the single-line array according to a further embodiment, wherein two piezoelectric actuators are connected to the image sensor and wherein a change of a distance between the image sensor and array is enabled for a focus function;

FIG. 11B is a schematic side view of the array of image sensor and single-line array of FIG. 11A;

FIG. 12A is a schematic top view of the image sensor and the single-line array according to an embodiment with a flexible mechanical connection between the piezoelectric actuator and the single-line array;

FIG. 12B is an arrangement of the image sensor and the single-line array that can be compared to FIG. 12A, wherein the actuators are connected to the single-line array via the mechanical deflecting means, according to an embodiment;

FIG. 13A is a schematic top view of the image sensor and the single-line array according to an embodiment, wherein the image sensor is moved in a relative manner with respect to the single-line array along a line extension direction;

FIG. 13B is a schematic top view of the image sensor and the single-line array according to an embodiment, wherein two actuators enable movement of the image sensor with respect to the single-line array;

FIG. 18A is a schematic top view of a multi-aperture imaging device according to an embodiment, which includes, with respect to the multi-aperture imaging device of FIG. 17A, piezoelectric actuators for changing the distance between image sensor and single-line array;

FIG. 18B is the beam-deflecting means of the multi-aperture imaging device of FIG. 1 in a changed position;

DETAILED DESCRIPTION OF THE INVENTION

Before embodiments of the present invention will be discussed in detail below with reference to the drawings, it should be noted that identical, functionally equal or equal elements, objects and/or structures in the different figures are provided with the same reference numbers in the different figures such that the description of these elements illustrated in different embodiments is inter-exchangeable or can be applied to one another.

Embodiments described below are described by reference to terms of relative location such as front, rear, left, right, top or bottom. It is obvious that these terms can be inter-exchanged with one another or in pairs without limiting the teachings described herein. Thus, these terms do not have a limiting effect, but merely serve to improve comprehensibility.

Figure 1:
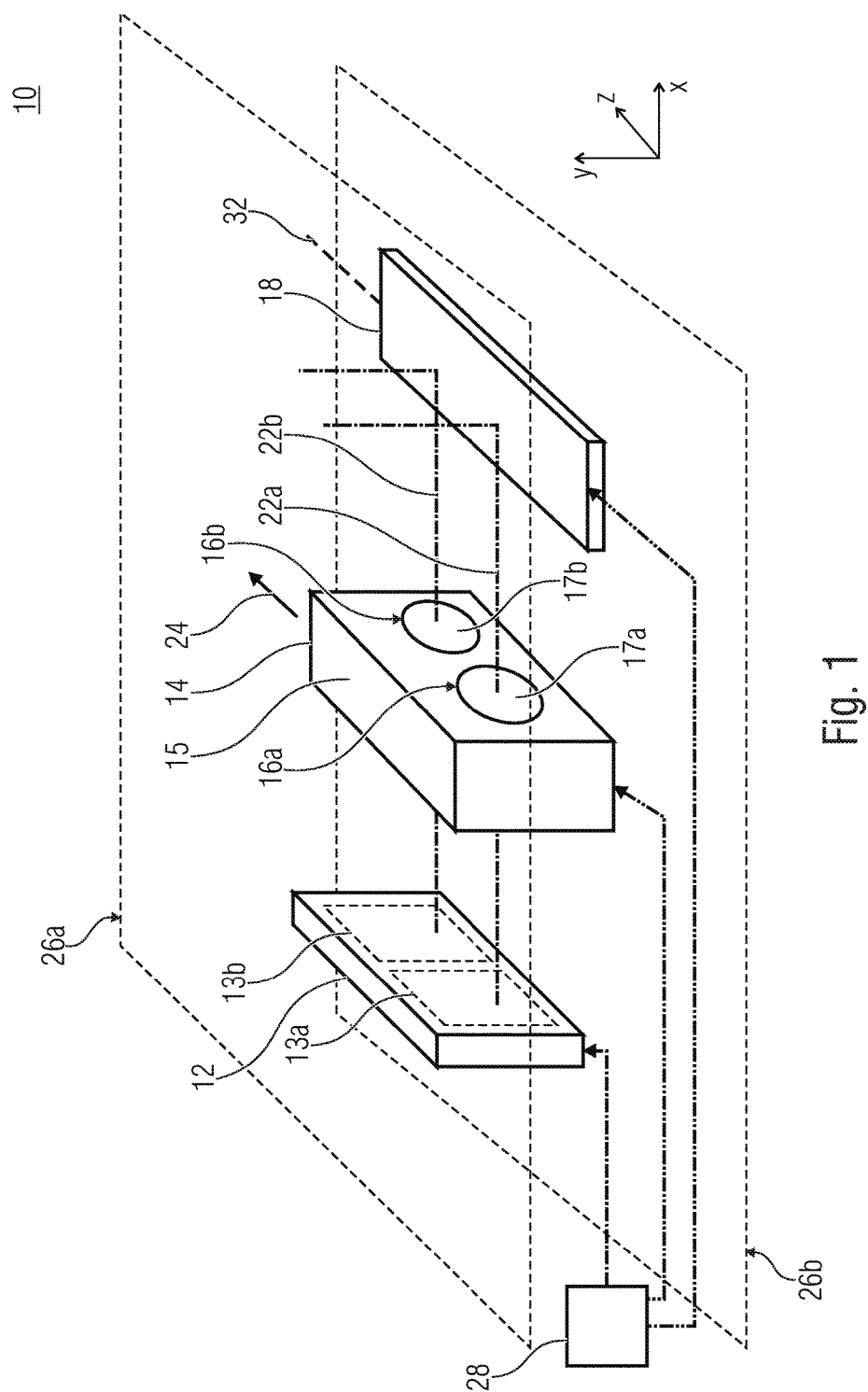
FIG. 1 is a schematic perspective view of a multi-aperture imaging device according to an embodiment.

FIG. 1 shows a schematic perspective view of a multi-aperture imaging device 10 according to an embodiment. The multi-aperture imaging device 10 includes an image sensor 12, a single-line array 14 of juxtaposed optical channels 16a and 16b. Each optical channel includes optics 17a or 17b for projecting a partial area of an object area on an image sensor area 13a or 13b of the image sensor 12. The multi-aperture imaging device 10 includes beam-deflecting means 18 for deflecting one, several or each optical path 22a and/or 22b of the optical channels 16a or 16b. Optical channels can be considered as a curve of optical paths 22a and 22b. The optical paths 22a and 22b can pass through the array 14, such that optical channels 16a and 16b can also pass through the array 14. The optical channels 16a and 16b are not limited, for example by the array 14 in an axial extension along a beam-deflecting direction between the image sensor 12 and the beam-deflecting means 18.

The single-line array 14 can include, for example, a carrier 15 through which the optical channels pass. For this, the carrier 15 can be configured in an opaque manner and can have transparent areas for the optical channels. Optics of the optical channels can be arranged within or adjacent to the transparent areas and/or at terminal areas thereof. Alternatively or additionally, the carrier 15 can be formed in a transparent manner and can comprise, for example, polymer material and/or glass material. Optics (lenses) can be arranged on a surface of the carrier 15, which influence projecting of the respective partial field of view of the total field of view on the respective image sensor area 13a-b of the image sensor 12.

The image sensor areas 13a and 13b can, for example, each be formed of a chip including a respective pixel array, wherein the image sensor areas can be mounted on a common substrate or a common board. Alternatively, it would also be possible that the image sensor areas 13a and 13b are each formed of part of a common pixel array extending continuously across the image sensor areas 13a and 13b, wherein the common pixel array is formed, for example on a single chip. Then, for example, merely the pixel values of the common pixel array are read out in the image sensor areas 13a and 13b. Obviously, different combinations of these alternatives are also possible, such as the presence of one chip for two or more channels and a further chip for different channels or the like. In the case of several chips of the image sensor 12, the same can be mounted, for example on one or several boards, such as all of them together or in groups or the like.

Figure 2:
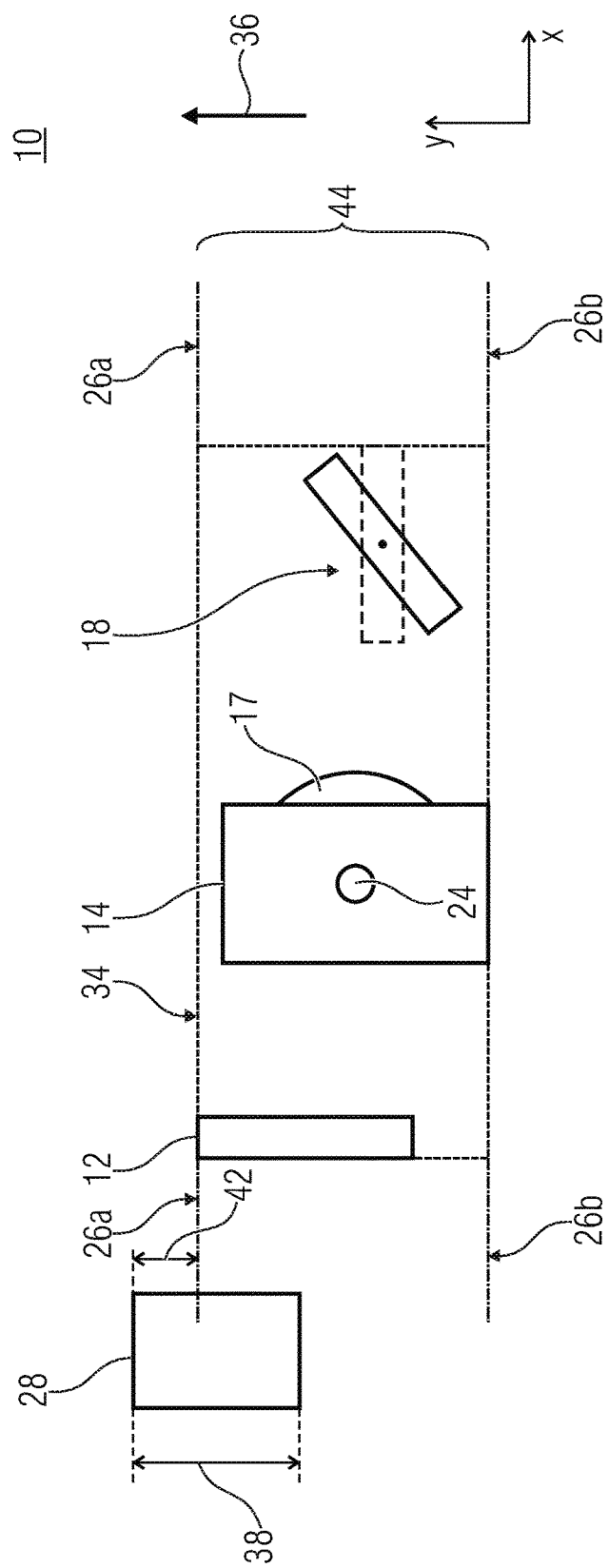
FIG. 2 is a schematic side sectional view of the multi-aperture imaging device of FIG. 1.

As described in more detail in the context of FIG. 2, the image sensor 12, the array 14 and the beam-deflecting direction 18 can span a cuboid in space. The cuboid can also be considered as a virtual cuboid and can have, for example, a minimum volume and, in particular, a minimum perpendicular extension along a direction to an y-direction or a thickness direction and can include the image sensor, the single-line array 14 and the beam-deflecting means 18. The minimum volume can also be considered such that the same describes a cuboid which is spanned by the arrangement and/or operating movement of the image sensor 12, the array 14 and/or the beam-deflecting means 18. The single-line array 14 can comprise a line extension direction 24 along which the optical channels 16a and 16b are juxtaposed, possibly parallel to one another. The line extension direction 24 can be stationary in space.

The virtual cuboid can have two sides that are directed oppositely parallel to one another, parallel to the line extension direction 24 of the single-line array 14 as well as parallel to part of the optical path 22a and/or 22b of the optical channels 16a and 16b, respectively, between the image sensor 12 and the beam-deflecting means 18. Simply put, but without limiting effect, these can, for example, be a top and a bottom of the virtual cuboid. The two sides can span a first plane 26a and a second plane 26b. This means the two sides of the cuboid can each be part of the plane 26a and 26b, respectively. Further components of the multi-aperture imaging device can be arranged completely but at least partly within the area between the planes 26a and 26b, such that installation space requirements of the multi-aperture imaging device 10 along a direction parallel to a surface normal of the planes 26a and/or 26b is low, which is advantageous. A volume of the multi-aperture imaging device can have a low or minimum installation space between planes 26a and 26b. An installation space of the multi-aperture imaging device can be great or of any size along the lateral sides or extension directions of planes 26a and/or 26b. The volume of the virtual cuboid is influenced, for example, by an arrangement of the image sensor 12, the single-line array 14 and the beam-deflecting means, wherein the arrangement of these components according to the embodiments described herein can be performed such that the installation space of these components along the direction perpendicular to the planes and hence the distance of planes 26a and 26b to one another becomes low or minimal.

Compared to other arrangements of the components, the volume and/or the distance of other sides of the virtual cuboid can be enlarged.

The multi-aperture imaging device 10 includes actuator means 28 for generating a relative movement between the image sensor 12, the single-line array 14 and the beam-deflecting means 18. The actuator means is arranged at least partly between the planes 26a and 26b. The actuator means 28 can be configured to move at least one of the image sensor 12, the single-line array 14 or the beam-deflecting means 18 in a rotational manner around at least one axis and/or in a translational manner along one or several directions. For this, the actuator means 28 can comprise at least one actuator that is configured to move the image sensor 12, the single-line array 14 and/or the beam-deflecting means 18 relative to at least one of the other components.

As described in more detail below, changing a distance between the image sensor 12 and the single-line array 14 can be used, for example, for changing a focus of the optical channels 16a and/or 16b. Alternatively or additionally, optical image stabilization can be enabled. For this, translational relative movement between the image sensor 12 and the single-line array 14 can be generated based on a movement of the image sensor 12 with respect to the single-line array 14 and/or vice versa by the actuator means 28. The relative movement can be generated along the line extension direction 24 or along a direction parallel or antiparallel thereto in order to obtain optical image stabilization along a first image axis of an image to be captured. Alternatively or additionally, a lateral shift of the beam-deflecting means 18 can be generated, for example along the line extension direction 24 and/or a rotation of the beam-deflecting means 18 around an axis of rotation 32 for switching between viewing directions of the multi-aperture imaging device 10 and/or for optical image stabilization along a second image axis. The axis of rotation 32 can be arranged, for example parallel to the line extension direction 24 and/or perpendicular thereto in space. The rotational movement of the beam-deflecting means 18 can be performed around the axis 32, wherein the axis 32 can be arranged parallel to the line extension direction 24.

According to embodiments, the actuator means 28 is configured to generate the relative movement between the image sensor 12, the single-line array 14, and the beam-deflecting means 18 such that a small extension of the multi-aperture imaging device 10 is obtained along a direction perpendicular to the planes 26a and/or 26b. The actuator means can be configured, for example in order to generate, for optical image stabilization, a relative translational shift between image sensor 12 and single-line array 14 parallel and/or anti-parallel to the line extension direction 24 and a rotational movement of the beam-deflecting means around the axis 32. This can prevent or eliminate the reservation of an installation space along a thickness direction perpendicular to planes 26a and/or 26b and can enable miniaturized multi-aperture imaging devices. This means that optical image stabilization does not or only slightly increase a size of the virtual cuboid along a direction perpendicular to the line extension direction 24 and perpendicular to the optical paths 22a and/or 22b between the image sensor 12 and the beam-deflecting means 18. This direction can, for example, be a y-direction which can also be referred to as thickness direction. The optical path 22a and/or 22b can pass, for example, between the image sensor 12 and the beam-deflecting means 18 at least in sections along an x-direction in space. The line extension direction 24 can be arranged, for example, essentially in parallel to a z-direction in space.

The x-direction, the y-direction and the z-direction can, for example, span a Cartesian coordinate system. According to further embodiments, an x-axis, a y-axis and/or a z-axis have an angle of ≠90° to one another. It is an advantage of arranging the actuator means 28 between the planes 26a and 26b that an extension of the multi-aperture imaging device 10 along the thickness direction y is not or only insignificantly increased by the actuator means 28. This allows miniaturized or flat structured multi-aperture imaging devices, at least along the y-direction or perpendicular to the line extension direction 24. This allows the arrangement of the multi-aperture imaging device in a flat housing.

FIG. 2 shows a schematic side sectional view of the multi-aperture imaging device 10. Dotted lines illustrate a virtual cuboid 34 as discussed in the context of FIG. 1. The virtual cuboid 34 has, for example, a minimum volume and still includes the image sensor 12, the single-line array 14 and the beam-deflecting means 18, wherein the virtual cuboid 34 can consider an intended movement of the beam-deflecting means 18, the single-line array 14 and the image sensor 12. The planes 26a and 26b can include two sides of the virtual cuboid 34 or can be spanned by the same. A thickness direction 36 of the multi-aperture imaging device 10 can be arranged normal to the planes 26a and/or 26 and/or parallel to the y-direction.

The actuator means can have a dimension or extension 38 parallel to the thickness direction 36. A portion 43 of at the most 50%, at the most 30% or at the most 10% of the dimension 38 can project beyond the plane 26a and/or 26b starting from an area 44 between planes 26a and 26b or can project out of the area 44. This means that the actuator means 28, at most, projects insignificantly beyond planes 26a and/or 26b. According to embodiments, the actuator means 28 does not project beyond planes 26a and 26b. It is an advantage that an extension of the multi-aperture imaging device 10 along the thickness direction 26 is not increased by the actuator means 28.

Figure 3:
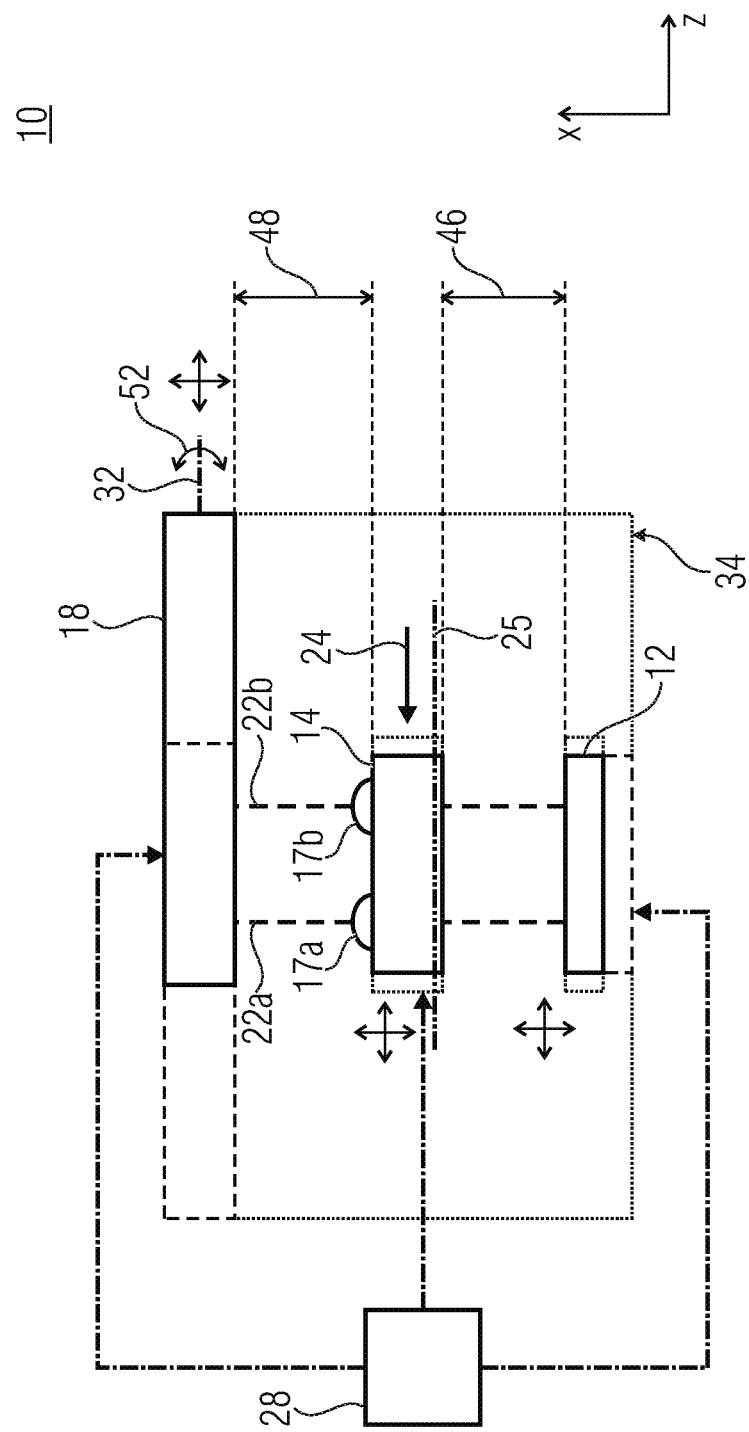
FIG. 3 is a schematic top view of the multi-aperture imaging device of FIG. 1 for illustrating the arrangement of components.

FIG. 3 shows a schematic top view of the multi-aperture imaging device 10 for illustrating the virtual cuboid. The actuator means can be implemented to change a distance 46 between the image sensor and the single-line array. This can be performed, for example, based on a shift of the image sensor 12 and/or the single-line array 14 along the x-direction or along the curve of the optical paths of the optical channels between the image sensor 12 and the beam-deflecting means 18. Here, the change of the distance 46 can be combined with the simultaneous change of the distance 48 or the distance 48 is unaffected, i.e. the distance 48 can be maintained. Here, simultaneous can mean that the distance 48 is changed during a same time interval as the distance 46 and/or is changed subsequently before a total field of view is captured. For example, when changing the focal position, i.e. the distance 46, the beam-deflecting means 18 can be accordingly co-moved by the actuator means 28, such that the distance 48 remains constant or at least essentially constant. Alternatively, the beam-deflecting means 18 can be stationary such that the distance 48 is variable. Alternatively or additionally, the actuator means 28 can be configured to change a distance 48 between the beam-deflecting means 18 and the single-line array 40. For example, the actuator means 28 can be configured to move the beam-deflecting means 18 and/or the single-line array 14 along the part of the optical path of the optical channels between the image sensor 12 and the beam-deflecting means relative to one another in a translational manner. Alternatively or additionally, the actuator means 28 can be configured to set the beam-deflecting means 18 into a rotational movement 52 around the axis of rotation 32. Alternatively or additionally, the actuator means 28 can be configured to shift the beam-deflecting means 18 parallel to the line extension direction 24 in a translational manner, for example to switch a viewing direction of the multi-aperture imaging device 10. Switching the viewing direction can mean that the beam-deflecting means deflects the optical path in a variable manner such that the deflected optical path can exit from the housing of the multi-aperture imaging device 10 through variable sides.

Alternatively or additionally, the actuator means 28 can be configured to move the single-line array 14 and the image sensor 12 relative to one another parallel to the line extension direction 24, for example by a translational movement of the single-line array 14 and/or by a translational movement of the image sensor 12 along the line extension direction 24. This can be used for optical image stabilization along at least one image axis. The translational movement can also be performed in a two-dimensional manner parallel to the line extension direction and perpendicular thereto (for example along the z-direction and along the y-direction) in order to allow optical image stabilization along two image axes.

The actuator means 28 for generating the relative movement can be arranged on a side of the image sensor 12 facing away from the single-line array 14, as illustrated for example in FIG. 2. Simply put, but without any limiting effect, this can be considered as an arrangement of an actuator of the actuator means 28 behind the image sensor 12. Alternatively or additionally, the actuator means 28 can be arranged laterally offset to the virtual cuboid 34 along a direction parallel to the line extension direction 24, as illustrated for example in FIG. 3. Simply put, but without any limiting effect, this can be considered as an arrangement of the actuator beside the image sensor 12, the single-line array 14 and/or the beam-deflecting means 18. Alternatively or additionally, the actuator means 28 or at least one actuator thereof can be arranged on a side of the beam-deflecting means facing away from the single-line array 14. This means that the relative movement can include a change of the distance 46 between the image sensor and the single-line array along the beam direction parallel to an optical path through the optical channels between the image sensor 12 and the beam-deflecting means 18 or a change of the distance 48 between the single-line array 14 and the beam-deflecting means 18 along the beam direction. This can enable the change of the focal position. Alternatively or additionally, the translational relative movement of the single-line array 14 and/or the translational relative movement of the image sensor 12 along the line extension direction 24 can allow optical image stabilization.

The actuator means can include an actuator, such as a voice-coil motor that is configured to change, for optical image stabilization, a relative position of the image sensor 12 with respect to the single-line array 14 in a plane 25 perpendicular to a line extension direction 24 of the single-line array 14 and parallel to the image sensor 12. The relative position can be variable along one or two directions.

Figure 4:
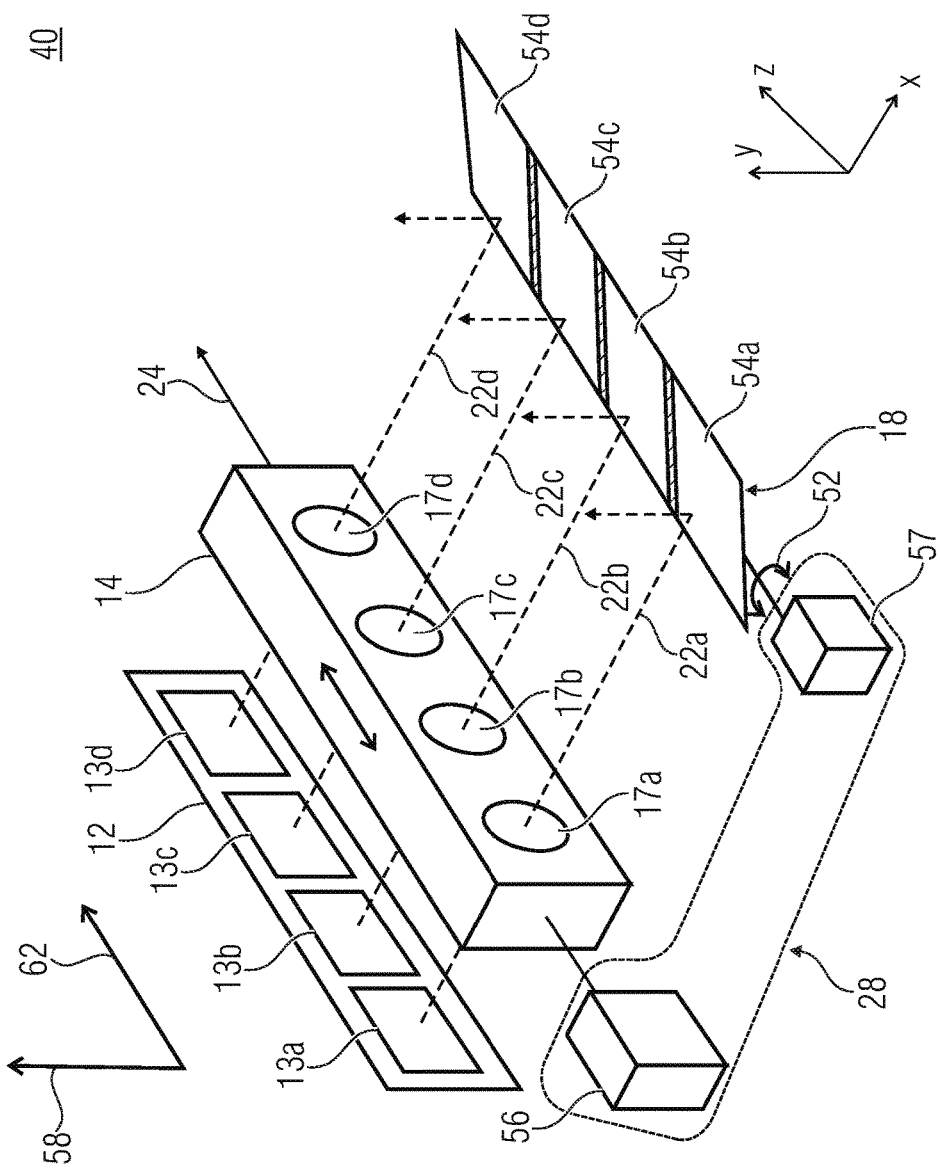
FIG. 4 is a schematic perspective view of a further multi-aperture imaging device according to an embodiment.

FIG. 4 shows a schematic perspective view of a multi-aperture imaging device 40 according to an embodiment. The multi-aperture imaging device 40 includes the image sensor 12, which includes, for example, four image sensor areas or image sensor partial areas 13a-d. Each image sensor area 13a-d can be allocated to an optical channel. The single-line array 14 includes four optics 17a-d that are parts of juxtaposed optical channels arranged along the line extension direction 24. The beam-deflecting means 18 includes, for example, a number of beam-deflecting elements 54a-d which can correspond to a number of optical channels and/or a number of optics 17a-d. Each beam-deflecting element 54a-d, for example, can be configured to deflect optical paths 22a-d running parallel to one another, at least in sections, in different directions between the image sensor 12 and the beam-deflecting means 18, such that each optical path 22a-d is directed into different but partly overlapping partial fields of view of a total field of view (object area). This means that while the optical paths 22a-d can be deflected in the same viewing direction, the optical paths 22a-d can have an angle to one another within the same viewing direction after deflection by the beam-deflecting means in order to be directed into differing partial fields of view. The beam-deflecting elements 54a-d can, for example, be facets and/or differently curved faces. Here, the number of facets can differ from the number of optical channels. The optical paths 22a-d can be oriented parallel to one another between the image sensor 12 and the beam-deflecting means 18 and can be deflected into differing directions by the beam-deflecting means. Alternatively or additionally, optics of the single-line array can deflect the optical paths 22a-d along at least one direction, such that the optical paths 22a-d cannot impinge on the beam-deflecting means 18 parallel to one another.

The actuator means 28 includes a first actuator 58 that is configured to move the single-line array 14 along the line extension direction 24 and/or opposite thereto in a translational manner. The actuator means 28 includes a second actuator 57 that is configured to generate the rotational movement 52. Based on the rotational movement 52, optical image stabilization can be obtained along an image axis 58 perpendicular to the line extension direction 24. The rotational movement can, for example, have an angular range of ±15°, ±10° or ±1° with regard to a position of the beam-deflecting means 18. This can be considered, for example, as additional tilting around a stable or position-discrete position of the beam-deflecting means. Based on the translational movement of the single-line array 14, optical image stabilization can be obtained along an image axis 62 parallel to the line extension direction 24.

Alternatively or additionally, the actuator 56 or a further actuator can be configured to move the image sensor 12 along or opposite to the line extension direction 24. It can be advantageous to shift the single-line array 40 in a translational manner in order to place only little mechanical stress on electrical connections of the image sensor.

Alternatively or additionally, the actuator 57 can be configured to move the beam-deflecting means 18 relative to the single-line array 14 and/or the image sensor 12 parallel to the line extension direction 24 or opposite to the same in order to obtain optical image stabilization along the image axis 62. The line extension direction 24 can be arranged parallel to the image axis 62.

As illustrated in FIG. 4, the beam-deflecting means 18 is configured to deflect the optical paths 22a-d of the optical channels, for example, along a positive y-direction. A rotational movement superimposed on the rotational movement 52 for optical image stabilization that can be generated, for example, by the actuator 57, can have the effect that the optical paths 22a-d are deflected in a different direction, for example, along a negative y-direction. The beam-deflecting means 18 can be configured, for example, in a reflecting manner on both sides, i.e. two main sides which are each configured in a reflecting manner. The rotational movement can also be considered as switching between viewing directions of the multi-aperture imaging device 40. Switching between the viewing directions can be performed, for example, by positions of the beam-deflecting means 18 that are stable along one, two or several directions, wherein for viewing directions of the multi-aperture imaging device 40 one stable position of the beam-deflecting means 18 each can be provided. As described in the context of further embodiments, the multi-aperture imaging device can be configured such that switching between viewing directions is also performed based on a translational movement of the beam-deflecting means 18. Translational movement or rotational movement can be configured such that the beam-deflecting means is switched between stable positions.

In the following, some advantageous arrangements and/or implementations of actuators of the actuator means will be described. The effective principles described herein can be combined or merged or substituted in an arbitrary manner.

Figure 5:
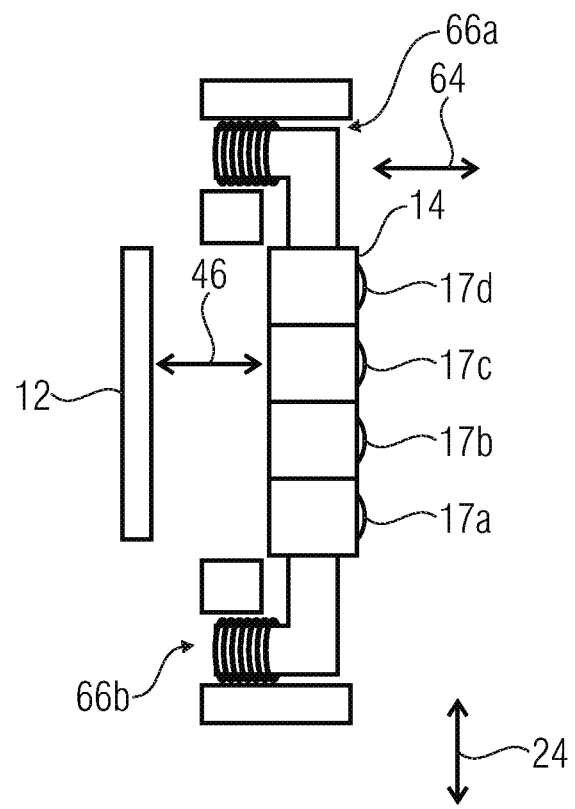
FIG. 5 is a schematic top view of an image sensor and a single-line array according to an embodiment, wherein the single array is connected to two actuators implemented as voice-coil motors and wherein a change of the distance between image sensor and array is enabled for a focus function.

FIG. 5 shows a schematic top view the image sensor 12 and the single-line array 14, wherein the single-line array 14 is connected to two actuators 56a and 56b of the actuator means that are configured as voice-coil motors. The actuators 66a and 66b are configured to move the single-line array along a direction 64 in order to change the distance 46 between single-line array 14 and the image sensor. The direction 64 can be arranged perpendicular to the line extension direction 24 in space and can run, for example, parallel to a direction of the optical paths of the optical channels. Based on a change of the distance 46, a focus of the optical channels can be varied, such that a focus function and/or an auto-focus function can be obtained. The actuators 66a and 66b can, for example, be arranged alternatively or additionally to the actuator 56 and can be part of the actuator means 28. The actuators 66a and 66b can be controlled synchronously or individually in order to specifically adjust parallel or angular orientation of the array 14 with respect to the image sensor 12.

Figure 6A:
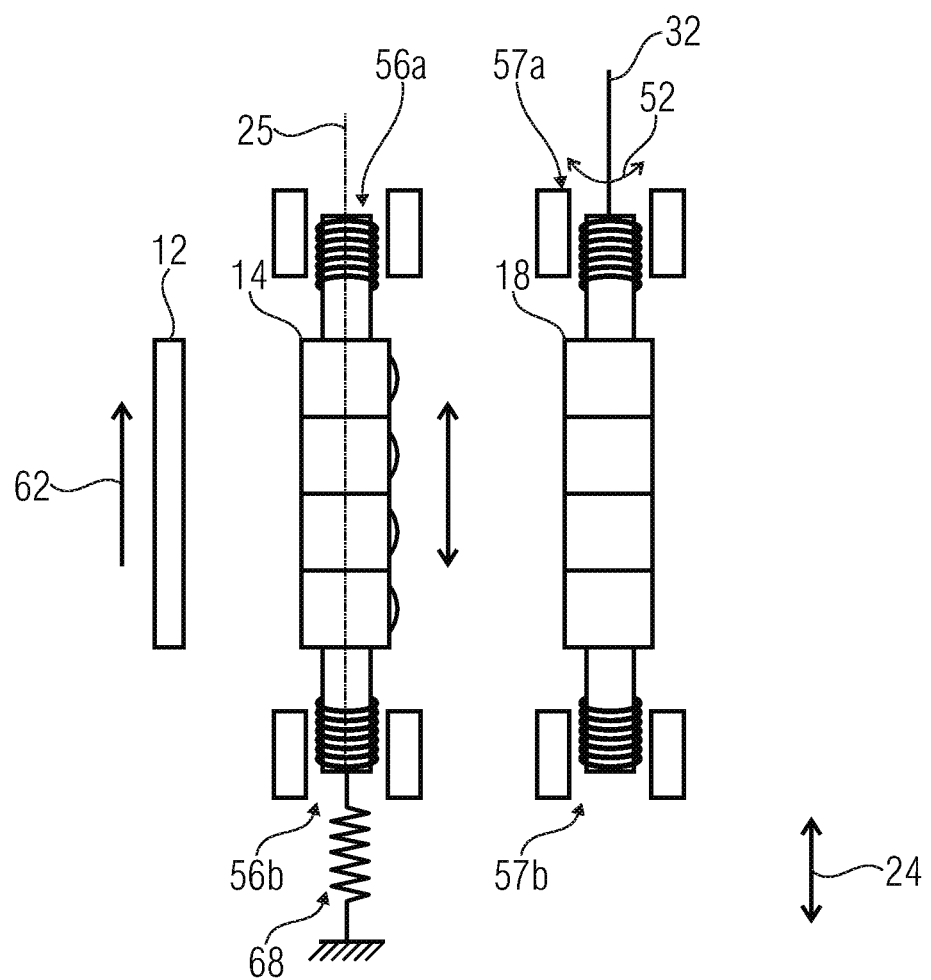
FIG. 6A-H are schematic top views of drive concepts for moving the single-line array or the beam-deflecting means according to embodiments.

FIG. 6A shows a schematic top view of image sensor 12, the single-line array 14 and the beam-deflecting means 18. Actuators 56a and 56b are connected to the single-line array 14 or arranged thereon and configured to shift the single-line array 14 along the line extension direction 24. This means that the actuator means can include an actuator 56a and/or 56b that is configured to move the single-line array 14 along the line extension direction 24.

Based on the shift of the single-line array 14 along line extension direction 24, for example, optical image stabilization along the image axis 62 can be obtained. The single-line array 14 can be mechanically connected to a restoring element 68. This can, for example, be a restoring spring. The spring element 68 can configured, for example, to move the single-line array 14 into a predefined position and/or an initial position when forces generated by the actuators 56a and/or 56b are absent. This can be, for example, a minimum position or a maximum position along the line extension direction 24 and/or a central position. The actuator 56a can be configured to change a relative position of the image sensor 12 with regard to the single-line array 14 in the plane 25. The spring element 68 can be implemented, for example, as a mechanical, pneumatic, hydraulic or other type of spring. The actuators 56a and/or 56b can implemented, for example, as voice-coil drives. The beam-deflecting means can be connected to actuators 57a and/or 57b that can be configured to set the beam-deflecting means 18 in the rotational movement 52 as described in the context with the actuator 57 illustrated in FIG. 4. The rotational movement 52 around the axis of rotation 32 can be used for optical image stabilization along an image axis perpendicular to the axis of rotation 32, for example, in the image axis 58 described in the context with FIG. 4 which is arranged, for example, perpendicular to the image axis 62. Simply put, image axes 58 and 62 can be image axes that are arranged perpendicular to one another that span an image area of an image to be captured.

The actuators 57a and 57b can be formed, for example, as pneumatic, hydraulic, piezoelectric actuators; DC-motors; step motors; thermal actuators; electrostatic actuators; electrostrictive and/or magnetostrictive actuators or drives; alternating current motors and/or voice-coil drives.

Figure 6B:
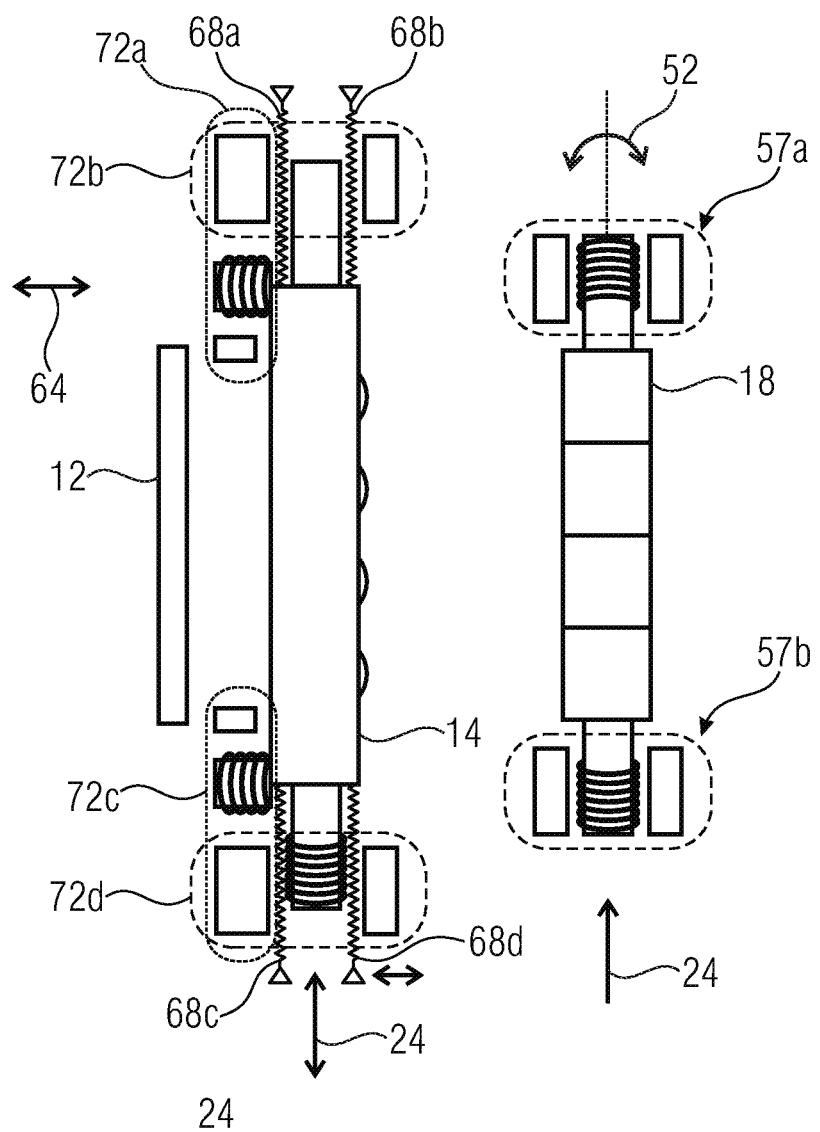

FIG. 6B shows a schematic top view of the arrangement of the image sensor 12 and the single-line array 14. The single-line array 14 can be connected to a plurality of actuators 72a-d, that are each configured to move the single-line array 14 along a single direction 24 or 64. Based on a parallel or sequential superposition of several actuator forces, parallel shift of the array 14 can take place along several directions, i.e. in the same direction or in serial, i.e. in superimposed different directions. An actuator 72a can be configured, for example to shift the single-line array 14 along the direction 64. A further actuator 72b can be configured to shift the single-line array 14 along the line extension direction 24. Although it is illustrated such that actuators 72a and 72b comprise a common stator magnet, both actuators 72a and 72b can also be formed of individual components, i.e., independent of one another.

The actuators 72a and 72b can be arranged on a first side of the single-line array 14. On a second side of the single-line array 14, for example an opposite side along the line extension direction 24, one or several further actuators can be arranged, such as actuators 72c and 72d which are equivalent to actuators 72a and 72b and are configured to generate the shift of the single-line array 14 together with actuators 72a and/or 72b. In particular actuators 72a and 72b can have individual control and in connection therewith individual deflection, such that specific tilting of the single-line array 14 with respect to the image sensor 12 results. Generally, drives 72a-d can have individual controls in order to compensate, for example, model-dependent deviations of the obtained movement of the actuators 72a-d from the control amount.

Spring elements 68a-d can be arranged between the single-line array 14 and fixed anchor points and can be configured to adjust a reference position, such as a maximum position or central position of the single-line array 14 when no forces of actuators 72a-d are acting. While on one side of the single-line array 14, two spring elements 68a and 68b or 68c and 68d are illustrated, also, a differing number of spring elements can be arranged, such as: no spring element, one spring element or more than two spring elements that can be connected in series or in parallel.

Figure 6C:
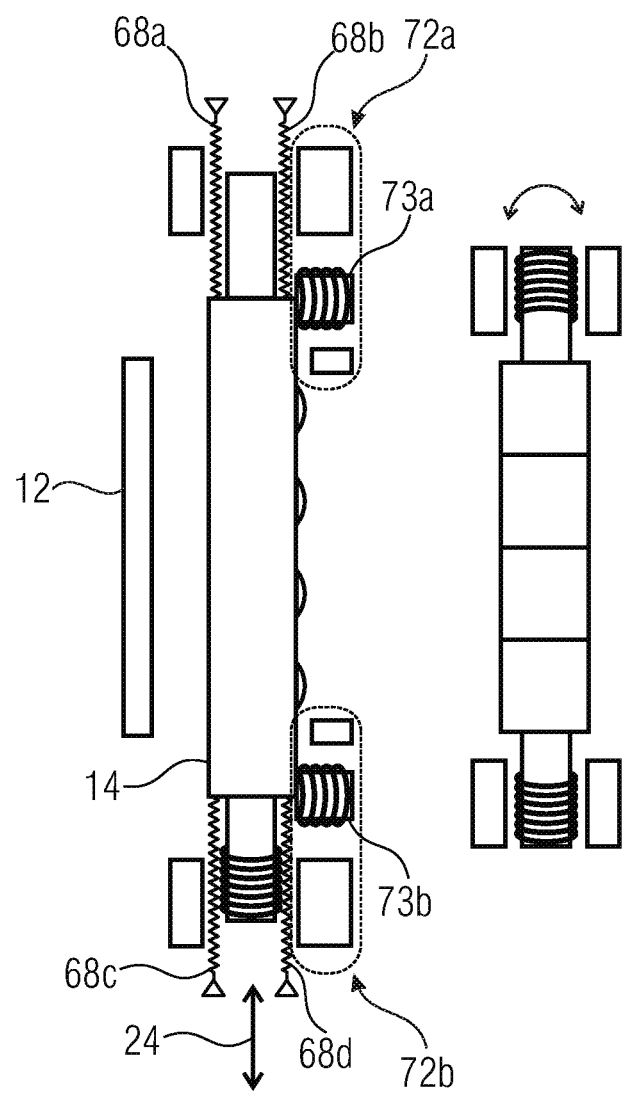

FIG. 6C shows a schematic view of the arrangement of FIG. 5B, wherein at least one component 73a or 73b of the actuator 72a and 72c, respectively, is arranged on a side of the single-line array 14 facing away from the image sensor 12. The components 73a and 73b can, for example be the voice coils of actuators 72a and 72d formed as voice-coil drives, wherein the actuators can also be formed differently. Also, further components can be arranged on the side of the single-line array 14 facing away from the image sensor 12, such as stator magnets. If the actuators 72a and/or 72c are formed differently to voice-coil drives, respective components can be arranged on a side of the single-line array 14 facing or facing away from the image sensor 12. Alternatively, it is also possible that one or several components of actuators are arranged laterally, i.e. along the line extension direction 24 beside the single-line array 14.

While FIGS. 6B and 6C are described such that the position of the actuators 72 is symmetrical and the actuators 72a-d are formed identically, both the position and the type of components of the actuators or the entire actuators can be freely combined and varied.

Figure 6D:
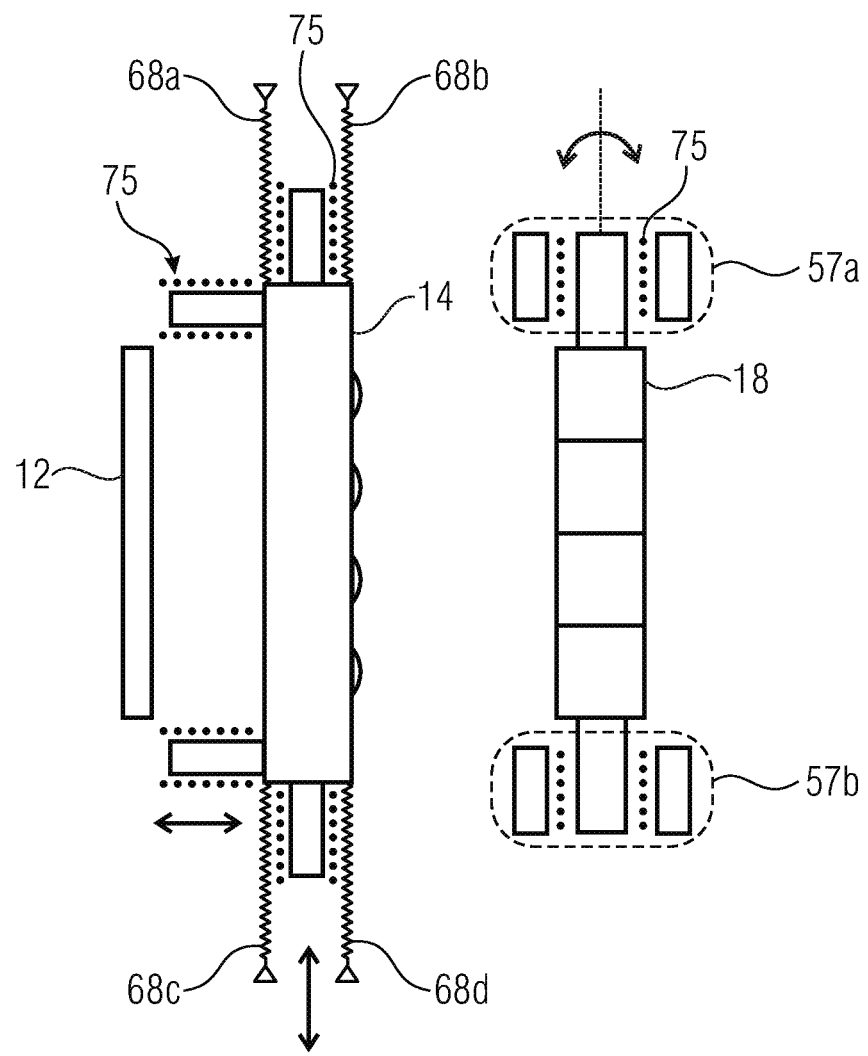

FIG. 6D shows a schematic top view of the arrangement according to FIG. 6B, wherein the actuators 72a and 72b and the actuators 57a and 57b have an interchanged arrangement of the coils and magnets in the voice-coil drives. In that way, at least one of the actuators 57a, 57b or 72a-d can be configured such that, as illustrated, one magnet is connected to the moveable object, the beam-deflecting means 18 or the single-line array 14, while the coils 75 are stationary. In that way, particularly in electrically obtained magnetic forces, electric application of the coils can be performed in a stationary manner, such that a transfer of electric energy to moveable components can be prevented, which is advantageous.

In other words, the actuators can be arranged such that drives for autofocus and/or optical image stabilization directly act on the optics array. Coils and magnets can be interchanged in an arbitrary manner. Spring elements can be arranged to allow guidance and/or reset of the moveable components. The spring elements can be arranged on a fixed suspension.

Figure 6E:
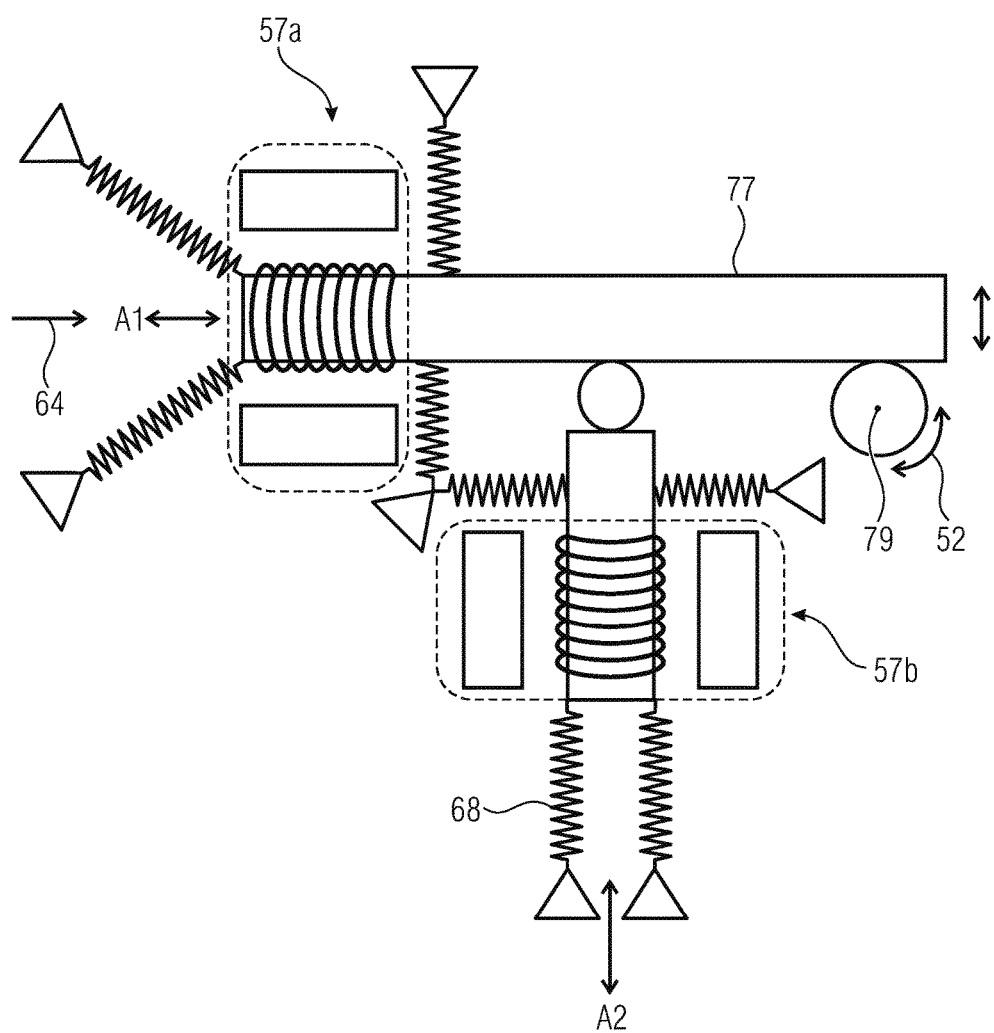

FIG. 6E shows a schematic side sectional view of a drive as it can be arranged, for example, for obtaining rotational movement of the beam-deflecting means 18, for example the rotational movement 52.

The drive can include two actuators 57a and 57b which are formed, for example, as voice-coil drives but, independent of one another, the same can also implement one or several arbitrary other actuator principles. The actuator 57a, for example is configured to generate a linear movement A1. The linear movement A1 can be parallel or antiparallel to the direction 64. The actuator 57b is, for example, configured to generate a linear movement A2 having a directional component arranged perpendicular to the linear movement A1 in space or, all in all, arranged perpendicular thereto. Additionally, the linear movement can be perpendicular in space to the line extension direction 24. A moveable element 77 of the actuator 57a, for example a cantilever or follower, can be connected to an axis of rotation 79 of the beam-deflecting means. The actuator 57b can be configured to provide force coupling with the moveable elements 77, such as mechanical or magnetic coupling. Thus, based on the linear movement A2, a direction along which the linear movement A1 moves the moveable element 77 can be influenced. This can be used for establishing or releasing force coupling, for example by mechanical contact, between the moveable element 77 and the axis of rotation 79.

Based on force coupling between the moveable element 77 and the axis of rotation 79 and the linear movement A1 along a positive direction 64, the rotational movement 52 along the clockwise direction can be obtained. Linear movement A1 along the negative direction 64 can result in a rotational movement 52 in an anticlockwise direction. If, despite full actuator travel of the actuator 57a, further rotational movement 52 in one of the directions is desired, the actuator can be moved back after releasing the force coupling between the moveable elements 77 and the axis of rotation 79 with the linear movement A2, without applying any actuator force on the beam-deflecting means. After that, force coupling between the moveable element 77 and the axis of rotation 79 can be established again, such as by a linear movement A2 in the opposite direction. This can also be obtained by restoring spring elements 68. Subsequently, the actuator 57a can be moved again, such that further rotational movement of the beam-deflecting means is performed via the axis of rotation 79.

Figure 6F:
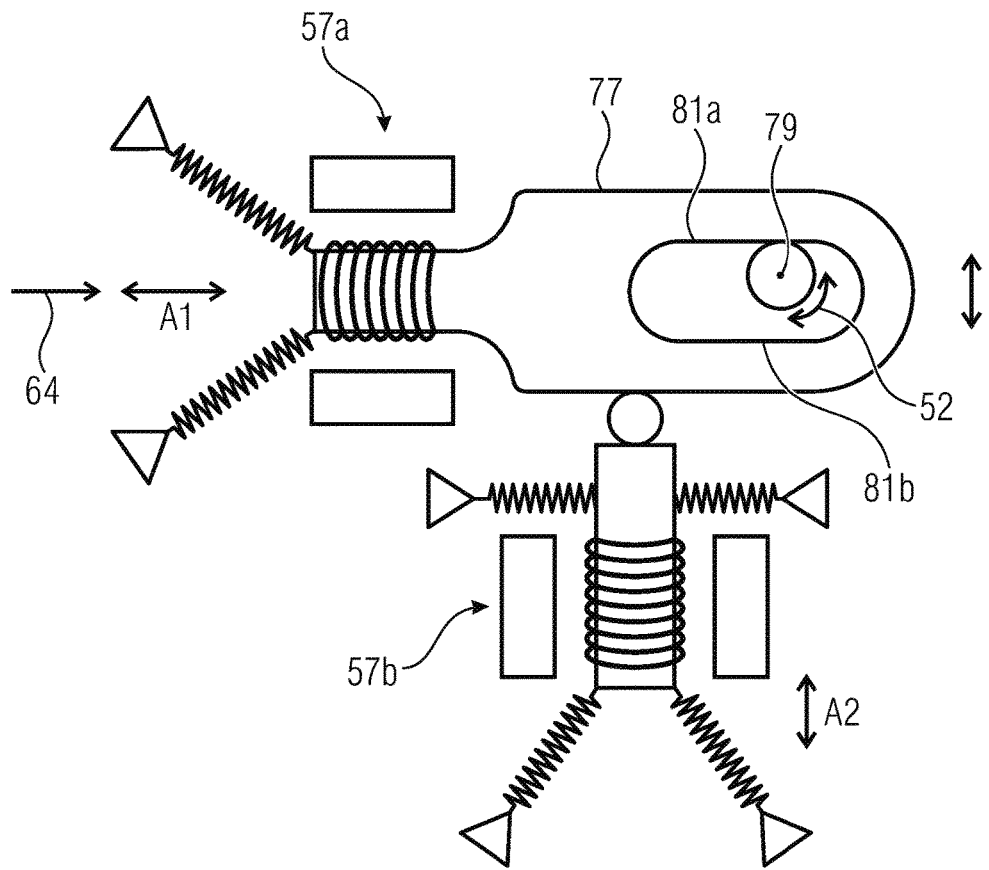

FIG. 6F shows a schematic side sectional view of the actuator concept of FIG. 6D where the moveable element 77 is configured as being contactable on both sides by the axis of rotation 79, for example as a fork or frame, such that two opposing sides 81a and 81b of the moveable element 77 are alternately in force coupling during the rotational movement 52 with the axis of rotation 79, i.e. at the most, one of the two sides 81a or 81b. Thus, for example the linear movement A1 along the positive direction 64, when in contact with the side 81a, and further a linear movement A1 along the negative direction 64, when in contact with the side 81b, can allow the rotational movement 52 in a clockwise direction. Alternatively or additionally, the linear movement A1 along the negative direction 64, when in contact with the side 81a, and further, the linear movement A1 along the positive direction 64, when in contact with the side 81b, can allow the rotational movement 52 in counterclockwise direction. Switching between sides 81a or 81b which is in contact or in force coupling with the axis of rotation 79 can be performed by means of the actuator 57b or the linear movement A2. This allows usage of the actuator travel of the actuator 57a in both directions of the linear movement A1. Thus, compared to the concept of FIG. 6E, a higher portion of the travel of the actuator 57a can be used for the rotational movement 52, which can result in a faster rotational movement and/or lower energy consumption.

Figure 6G:
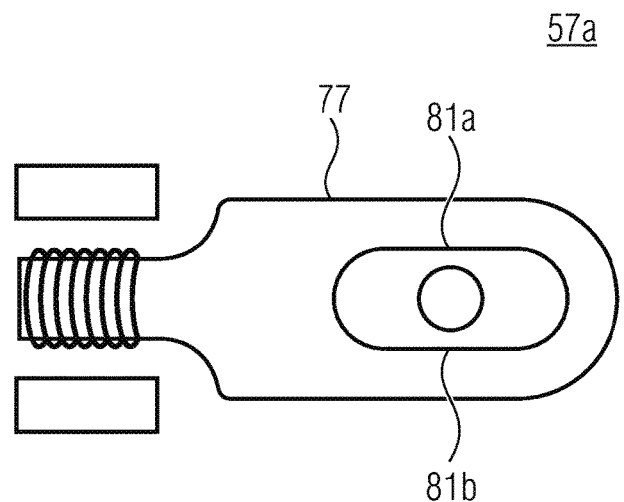

FIG. 6G shows a schematic view of a position of the movable element 77, where neither the side 81a nor the side 81b are in contact with the axis of rotation 79, for example since based on the linear movement A2, force coupling with the one side is released and force coupling with the other side is not yet established.

While FIGS. 6F and 6G are illustrated such that two opposite sides can be in force coupling with the axis of rotation, the same can also be two adjacent sides. While FIGS. 6F and 6G are illustrated such that sides 81a and 81b are arranged opposite to one another along a horizontal travel, at least one of the sides 81a and/or 81b can also be arranged along a vertical direction. The position of the actuators 57a and 57b, for example, can also be mutually interchanged.

In combination with the beam-deflecting means 18, a large and practically unlimited setting angle can be obtained by such an actuator in order to obtain switching of the viewing direction of the multi-aperture imaging device. Further, the same actuator unit can be used for providing the necessitated rotational movement of the beam deflecting unit 18 for obtaining image stabilization along the direction 58, wherein smaller angles of rotation are needed than for switching the viewing direction of the multi-aperture imaging device and the necessitated movement is based, for example, merely on the actuation of the actuator 57a along the direction A1.

Further, the coupling point between moveable element 77 and axis of rotation 79 can be configured such that a further rotational movement is prevented when the two components come in contact and when no movement along the direction A1 takes place. In other words, the coupling point between moveable element 77 and axis of rotation 79 serves, in the case of non-actuation of the actuator 57a, to fix the angle of orientation of the axis of rotation 79 and, hence, has the effect of a locking brake.

In one embodiment, mechanical coupling of moveable element 77 and axis of rotation 79 exists for the case of non-actuation of the actuator 57b. In other words, the coupling exists when the actuator 57b is switched off. Thus, the effect of a locking brake is advantageously obtained when the actuator 57b is switched off, which results in lower energy consumption. For applying a force necessitated for obtaining mechanical coupling, for example, the spring elements 68 can be used.

Figure 6H:
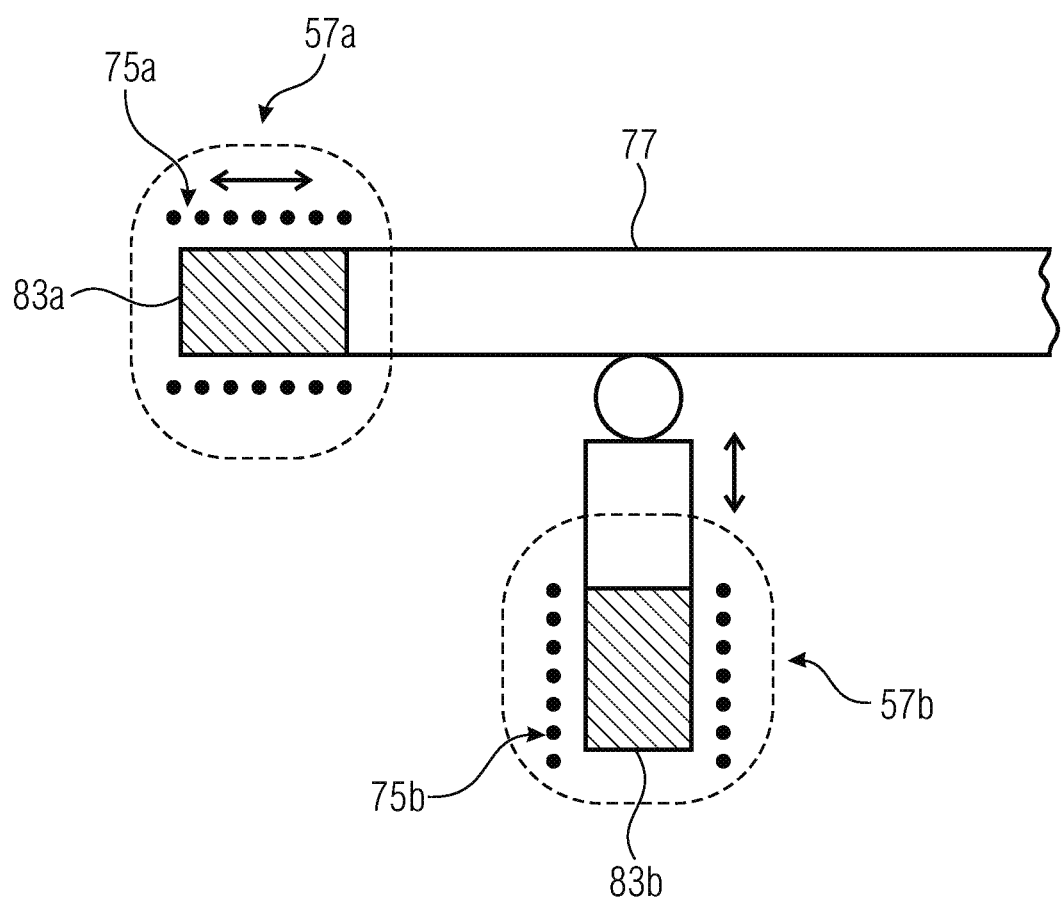

As indicated in FIG. 6H, in at least one of the actuators 57a or 57b, the arrangement of magnets or coils can also be interchanged, such that magnets 83a and/or 83b are arranged in a movable manner and coils 57a and/or 57b of the actuators 57a and 57b, respectively, are arranged in a stationary manner.

In other words, an actuator can also be implemented as a combination of linear drives, one of which, for example the actuator 57a, is configured to provide an advance for a moveable element and the other one to provide variable coupling between the movable element and the axis of rotation of the driven element. The cantilever or the moveable element can perform a tilting movement or a pure translational movement perpendicular to the advance direction.

Figure 7:
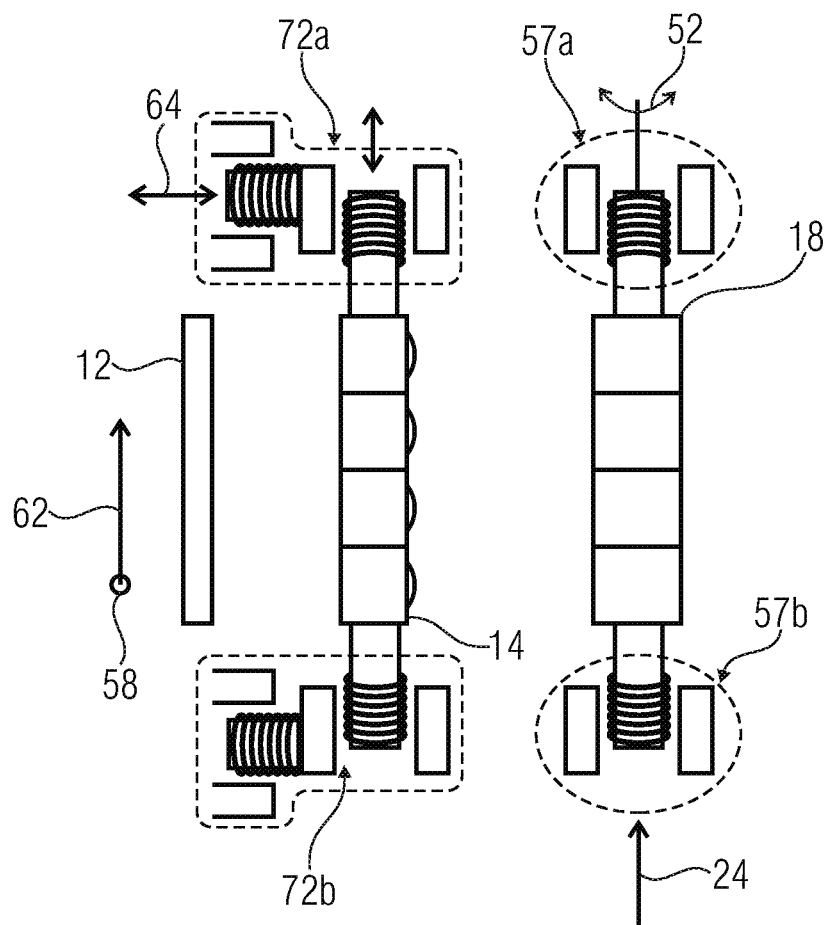
FIG. 7 is a schematic top view of the image sensor, the single-line array and the beam-deflecting means wherein a mode of operation of actuators of FIGS. 5 and 6A-H is combined according to an embodiment.

FIG. 7 shows a schematic top view of the image sensor 12, the single-line array 14 and the beam-deflecting means 18 where a mode of operation of the actuators 66a and 56a and 66b and 56b, respectively, of FIGS. 5 and 6 is combined. This can also be considered such that actuators 66a and 56a and 66b and 56b, respectively, are arranged in a stacked manner. The single-line array can be connected to actuators 72a and 72b which are connected to the single-line array 14 along the line extension direction 24, for example, at end positions of the single-line array 14. The actuators 72a and/or 72b can be configured to move the single-line array 14 along the line extension direction 24 (i.e. parallel and/or anti-parallel thereto) and along the direction 64. The plunger of a first voice-coil drive can, for example, at least partly include an anchor of a second voice-coil drive. Thus, the actuators 72a and 72b can allow an auto-focus function or focus function as well as image stabilization along the line extension direction 24 and/or the image axis 62. The actuators 57a and 57b can allow optical image stabilization along the image axis 58. While according to the embodiment in FIG. 7, two actuators 72a and 72b are arranged on the single-line array 14 and two actuators 57a and 57b on the beam-deflecting means 18, one actuator 72a or 72b and one actuator 57a or 57b can be arranged, respectively. For example, free ends of the single-line array 14 or the beam-deflecting means 18 can be mounted by a bearing in a moveable manner. Alternatively, more than two actuators can be arranged. The structures can additionally comprise structural elements for guiding the movement, such as slide, roller or spring bearings as well as spring elements for applying counter-forces to the forces generated by the actuators.

Figure 8A:
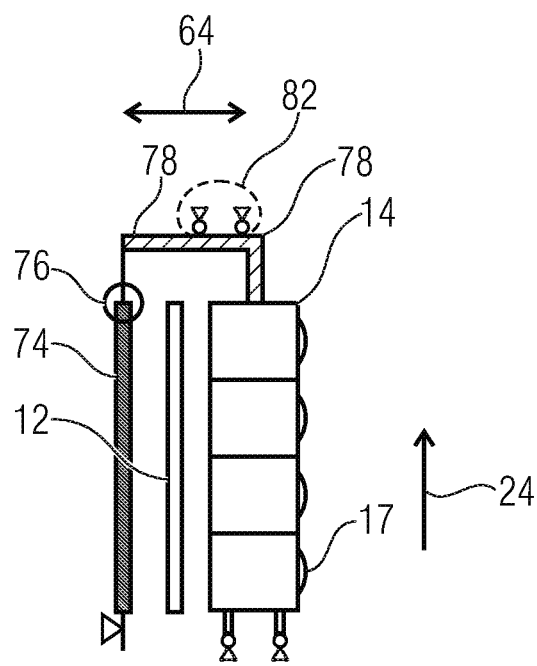
FIG. 8A is a schematic top view of the image sensor and the single-line array which is moved in a translational manner based on a piezoelectric actuator and wherein a change of a distance between image sensor and array is enabled for a focus function.

FIG. 8A shows a schematic top view of the image sensor 12 and single-line array 14 which is moved in a translational manner along the direction 64 based on a piezoelectric actuator 74. The actuator 74 can be part of the actuator means 28 and can be arranged on a side of the image sensor 12 facing away from the single-line array 14. This means that the image sensor 12 can be arranged between the actuator 74 and the single-line array 14. The actuator 74 can be configured, for example, to deform along or opposite to the direction 64. The actuator 74 can, for example, be formed as piezo-electrical bending actuator and can be configured to move a (possibly non-clamped) end 76 along or opposite to the direction 64. Alternatively or additionally to the end 76 (end area), a different area of the actuator 74 can be moved along a beam direction parallel to an optical path through the optical channels when the actuator 74 deforms.

A mechanical deflecting means 78 can be arranged between the actuator 74 and the single-line array 14, which transfers the movement of the piezoelectric actuator 74 to the single-line array 14, such that the same is moved along the direction 64 or opposite to the same in a translational manner in order to change an optical focus of the multi-aperture imaging device. The mechanical deflecting means 78 and/or the single-line array 14 can be mounted via a bearing 82 such that the degrees of freedom of movement of the single-line array 14 are limited by deflection of the actuator 74 on the direction 64 or a direction anti-parallel thereto. The actuator 74 can be a bending actuator that is configured to deform during actuation along a beam direction parallel to an optical path through the optical channels. This allows high precision of the focus function and achievement of great moving velocities. It is an advantage of piezoelectric actuators that an arrangement of a multi-aperture imaging device 10 in a flat housing is enabled, for example in a mobile phone such as a smartphone.

An extension of the actuator 74 along the line extension direction can be, for example, in a range of at least 1 mm and at the most 100 mm, from at least 2 mm and at the most 50 mm or of at least 7 mm and at the most 25 mm, for example approximately 15 mm. An extent of a translational movement of the single-line array and/or the image sensor along the line extension direction for optical image stabilization can be in a range of at least 10 µm and at the most 2000 µm, of at least 20 µm and at the most 1000 µm or of at least 50 µm and at the most 500 µm, for example approximately 300 µm. The structures could further comprise structural elements for guiding the movement, such as slide, roller or spring bearings as well as spring elements for applying counter-forces to the forces generated by the actuators.

Figure 8B:
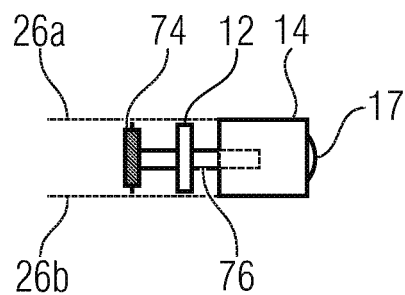
FIG. 8B is a schematic side view of the image sensor and the single-line array of FIG. 8A.

FIG. 8B shows a schematic side view of the image sensor 12 and the single-line array 14 of FIG. 8A. The actuator 74 of the actuator means is arranged completely between planes 26a and 26b.

Figure 9A:
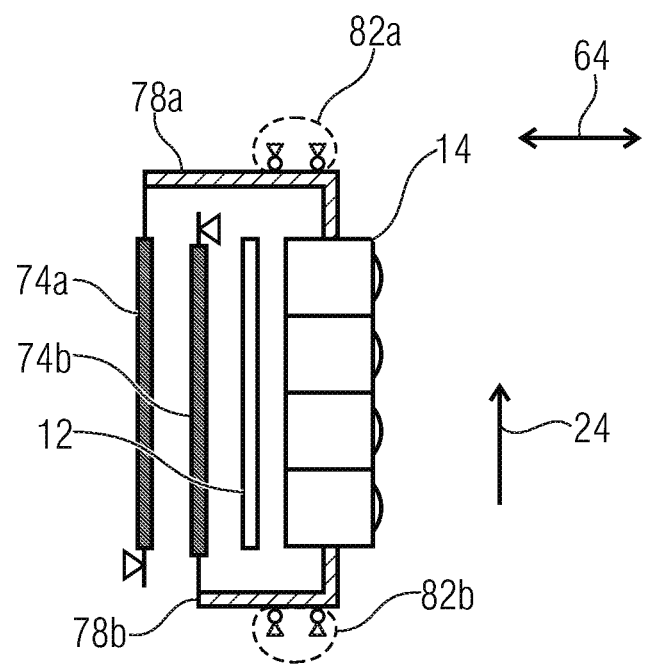
FIG. 9A is a schematic top view of the image sensor and the single-line array according to an embodiment, wherein, in comparison to FIG. 8A, the single-line array is connected to two piezoelectric actuators and wherein a change of a distance between image sensor and array is enabled for a focus function.

FIG. 9A shows a schematic top view of the image sensor and the single-line array, wherein, compared to FIG. 8A, the single-line array 14 is connected to two piezoelectric actuators 74a and 74b. The mechanical deflecting means 78a can be arranged between the single-line array 14 and the piezoelectric actuator 74a, as described in the context of the mechanical deflecting means 78 of FIG. 8A. Similarly, the piezoelectric actuator 74 can be connected to the single-line array 14 via the mechanical deflecting means 78b. Simply put, the distance between the image sensor 12 and the single-line array can be made due to a one-sided (FIG. 8A) or two-sided (FIG. 9A) actuation of the single-line array 14.

Figure 9B:
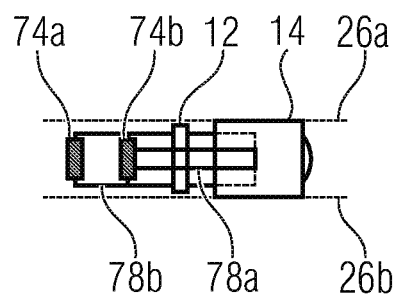
FIG. 9B is a schematic side view of the image sensor and the single-line array of FIG. 9A.

FIG. 9B shows a schematic side view of the image sensor 12 and the single-line array 14 of FIG. 9A. The actuators 74a/b of the actuator means are arranged, for example, completely between planes 26a and 26b.

FIG. 10A shows a schematic top view of the image sensor 12 and the single-line array 14, wherein changing the distance 46 for the focus function is enabled based on a movement of the image sensor 12 along or opposite the direction 64. An actuator, for example the piezoelectric actuator 74 can be connected directly or indirectly, for example via the mechanical deflecting means 78, to the image sensor 12 and can be configured to shift the image sensor 12, during actuation, along the direction 64 or opposite thereto. Since the distance 46 can play an essential role for focusing the optical channels, it can have no or only subordinate influence for the focus function whether the image sensor 12 or the single-line array 14 is moved for changing the distance 46. It can be advantageous to move the single-line array 14 in order to keep mechanical stress of electrical contacts of image sensor 12 low. The structures can still comprise structural elements for guiding the movement, such as slide, roller or spring bearings as well as the spring elements for applying counter-forces to the forces generated by the actuators.

FIG. 10B shows a schematic side view of the image sensor 12 and the single-line array 14 of FIG. 10A. The piezoelectric actuator is arranged between planes 26*a* and 26*b*.

FIG. 11A shows a schematic top view of the image sensor 12 and the single-line array 14, wherein two piezoelectric actuators 74*a* and 74*b* are connected to the image sensor 12 and are configured to change the distance 46 between the image sensor 12 and the single-line array 14. The relative movements of the configurations of FIGS. 10A, 10B, 11A and 11B can also be implemented without the bearings of the mechanical deflecting means, since symmetrical force application to the moving component can be performed.

With comparative shifts of the actuators 74*a* and 74*b*, tilting of the single-line array 14 or the image sensor 12 can be prevented. The structures can further include structural elements for guiding the movement, such as slide, roller or spring bearings as well as spring elements for applying counter-forces to the forces generated by actuators.

FIG. 11B shows a schematic side view of the arrangement of image sensor and single-line array of FIG. 11A.

While the actuators of FIGS. 8A, 8B, 9A, 9B, 10A, 10B, 11A and 11B are illustrated such that the image sensor 12 is arranged between the single-line array 14 and the actuators 74 and 74*a* and 74*b*, respectively, for example, at least one of the actuators can be arranged on a side of the beam-deflecting means facing away from the single-line array 14, such that the beam-deflecting means 18 is arranged between the actuator and the single-line array 14. This means that the image sensor 12 or the beam-deflecting means 18 can be arranged between one actuator 74 of the actuator means and the single-line array 14. The actuator 74 can be configured to change the distance 46 between the image sensor 12 and the single-line array 14.

The mechanical deflecting means 78 and 78*a* and 78*b*, respectively, can be configured with high rigidity and can be assumed, for example, as rigid body.

FIG. 12A shows a schematic top view of the image sensor 12 and the single-line array 14, wherein compared to the illustration in FIG. 8A a flexible mechanical connection is arranged between the piezoelectric actuator 74 and the single-line array 14. The direction of movement of the actuator can be deflected based on the bearing 82*a*. The flexible mechanical connection 84*a*, can be, for example, a flexible band, a wire structure or the same, wherein the bearing 82*a* is configured to deflect the movement of the actuator 74 along the direction 64 such that translational movement of the single-line array 14 along the line extension direction 24 is enabled. A further deflecting element 84*b* can be arranged on a side of the single-line array 14 arranged opposite to the flexible mechanical deflecting element 84*a*, which is arranged between the restoring element 68 and the single-line array 14. Based on the restoring element 68, for example, when taking away the actuation of the piezoelectric actuator 74, the single-line array 14 can be brought back to the predefined position. Compared to FIG. 8A, the arrangement of the actuator can be used for translational movement of the single-line array 14 along the line extension direction 24 for optical image stabilization along the image axis 62.

The predefined position can, for example, be a minimum deflection of the actuator 74 and/or the single-line array 14 which is changed towards a higher value, for example, a maximum, based on the actuation of the actuator 74.

FIG. 12B shows an arrangement of the image sensor and the single-line array 14, which can be compared to FIG. 12A, wherein the actuator 74*a* and the actuator 74*b* can be connected to two sides of the single-line array 14 via the mechanical deflecting means 84*a* and 84*b*, respectively, in order to allow reciprocating movement of the single-line array 14 along the line extension direction 24.

FIG. 13A shows a schematic top view of the image sensor 12 and the single-line array 14, wherein the concept for optical image stabilization according to FIG. 12A is modified in that the image sensor 12 is moved in a relative manner with respect to the single-line array 14 along the line extension direction 24. Based on bearings 82*a*-*d*, movement of the image sensor 12 can be limited to the translational movement along the line extension direction 24.

FIG. 13B shows a schematic top view of the image sensor 12 and the single-line array 14, wherein the concept for obtaining optical image stabilization as described in the context of FIG. 12B is modified in that based on the actuation of actuators 74*a* and 74*b* a movement of the image sensor 12 is obtained with respect to the single-line array 14 along the line extension direction 24. This means that the actuator means can have two actuators, wherein at least one of the actuators can be formed as bending actuator. The actuator can be configured to change a distance between the image sensor 12 and the single-line array 14 and to deform during actuation along a beam direction parallel to an optical path through the optical channels. The first actuator 74*a* and the second actuator 74*b* can be connected to different areas, ends and/or end areas of the single-line array 14 along the line extension direction 24.

It becomes clear that the actuation principles can be combined with one another without any limitations. In particular, for example, image stabilization can be obtained by moving the image sensor 12 with respect to the single-line array 14 and/or a change of the focus can be obtained based on a movement of the single-line array 14 with respect to the image sensor 12. According to further embodiments, the principles for generating the relative movement of components are inter-exchangeable. According to further embodiments, also merely one component can be moved with respect to another component, for example the single-line array 14 with respect to the image sensor 12 or vice versa in order to obtain both the image stabilization along the image axis 62 as well as the change of focus.

Figure 14:
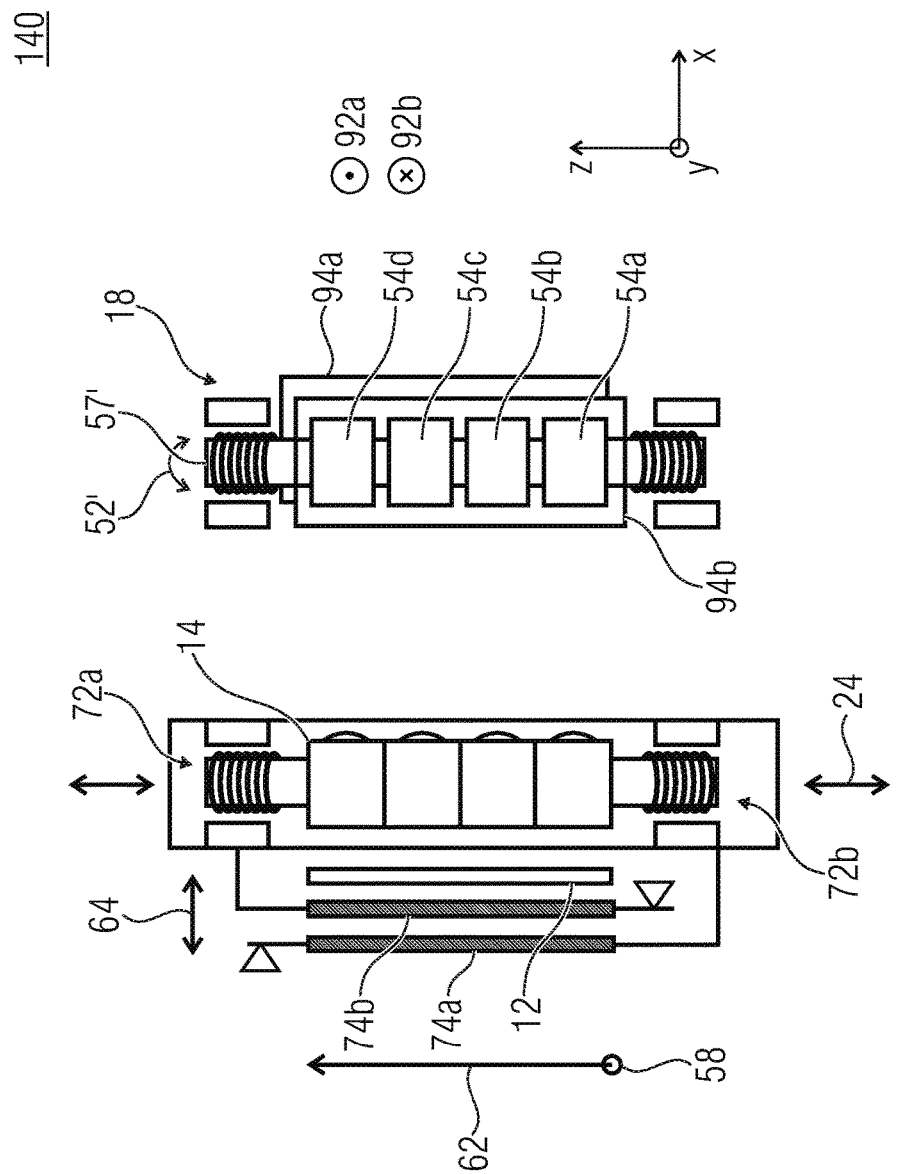
FIG. 14 is a schematic top view of a further multi-aperture imaging device according to an embodiment.

FIG. 14 shows a schematic top view of a multi-aperture imaging device 140 according to an embodiment. The actuators 74*a* and 74*b* are configured to move the single-line array 14 along or opposite to the direction 64 as described in the context of FIG. 9A. Voice-coil drives 72*a* and 72*b* are arranged on the single-line array, which are configured to shift the single-line array 14 along the line extension direction 24 or opposite thereto, as described in the context of FIG. 7.

An actuator 57' is connected to the beam-deflecting means 18 and configured to generate a rotational movement 52'. The rotational movement 52' can include the rotational movement 52 as described in the context of FIG. 7 and can be used for optical image stabilization along the image axis 58. Alternatively or additionally, the actuator 57' can be configured to generate the rotational movement 52' such that a viewing direction of the multi-aperture imaging device 140 along which the optical paths of the optical channels are deflected is deflected in a stable manner along one, two or several directions along a first viewing direction 92a and/or a second viewing direction 92b. The first viewing direction 92a and/or the second viewing direction 92b can be arranged parallel and/or anti-parallel to a y-direction. The viewing directions 92a and/or 92b can, for example, be arranged essentially perpendicular to the line extension direction 24 and to a course of the optical channels between the image sensor 12 and the beam-deflecting means 18. The viewing directions can run in space in an arbitrary manner on an orientation of the beam-deflecting means with respect to the optical paths.

The optical paths of the optical channels can include transparent areas 94a and 94b, respectively, of a housing where the multi-aperture imaging device 140 is arranged in order to capture a total field of view or partial field of view. The rotational movement 52 can be superposed to the position of the beam-deflecting means 18 that is stable along one, two or several directions in order to obtain the rotational movement 52'. This can also be considered such that such a position-discrete position of the beam-deflecting means 18 for generating a viewing direction of the optical channel can be superimposed with an analog movement for optical image stabilization. While the multi-aperture imaging device 140 is described such that the same comprises two viewing directions 92a and 92b, the multi-aperture imaging device 140 can also comprise at least a third view direction which is influenced by a deflection angle of the beam-deflecting means 18. This means that the beam-deflecting means 18 can be configured to deflect the optical path of the optical channels at least in a first viewing direction 92a and a second viewing direction 92b. The actuator means can comprise at least one actuator, for example the actuator 57' that is configured to move the beam-deflecting means in a rotational manner. The actuator 57'a can be arranged in a plane of the beam-deflecting means that is arranged perpendicular to the first or second viewing direction, for example at least partly in an area between the planes 26a and 26b. The beam-deflecting means 18 can comprise, for example, the beam-deflecting elements (facets) 54a-d.

In an area of the transparent areas 94a and/or 94b, switchable diaphragms can be arranged. The apertures can for example be mechanical or electrochromic apertures. The diaphragms can be controlled such that the same at least partly optically close the transparent areas 94a and/or 94b when no total field of view is captured by the respective transparent area 94a or 94b.

Figure 15:
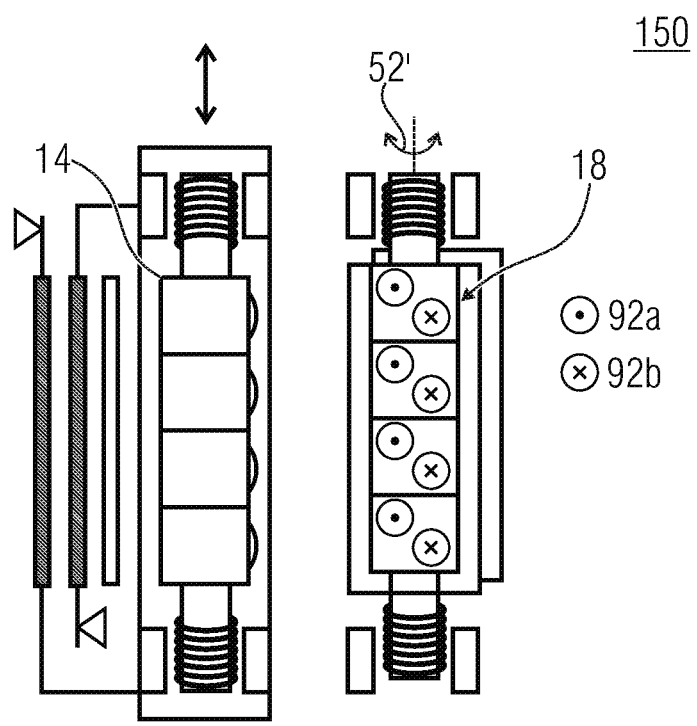
FIG. 15 is a schematic top view of a multi-aperture imaging device according to an embodiment, wherein the beam-deflecting means is formed as planar reflecting face.

FIG. 15 shows a schematic top view of a multi-aperture imaging device 150, which is modified compared to the multi-aperture imaging device 140 in that the beam-deflecting means 18 is formed as planar reflecting surface. The beam-deflecting means 18 is, for example, formed such that the same comprises a first main side and a second main side (for example a front side and a rear side) which are each formed in a reflecting manner. Based on a tilting of the beam-deflecting means 18, such that the first main side of the beam-deflecting means 18 is arranged facing the single-line array 14 at an angle, for example, the first viewing direction 92a can be obtained. If the beam-deflecting means 18 is moved based on the rotational movement 52' such that the second main side is arranged facing the beam-deflecting means 18 at an angle, the second viewing direction 92b can be obtained. The beam-deflecting means 18 can be configured in a planar or curved manner. A curvature of the beam-deflecting means 18 can allow deflection of the optical paths of the optical channels along differing directions to differing partial fields of view of the total field of view. If the beam-deflecting means 18 is implemented in a planar manner, deflection of the optical paths of the optical channels can be obtained based on the optics of the single-line array 14.

Figure 16:
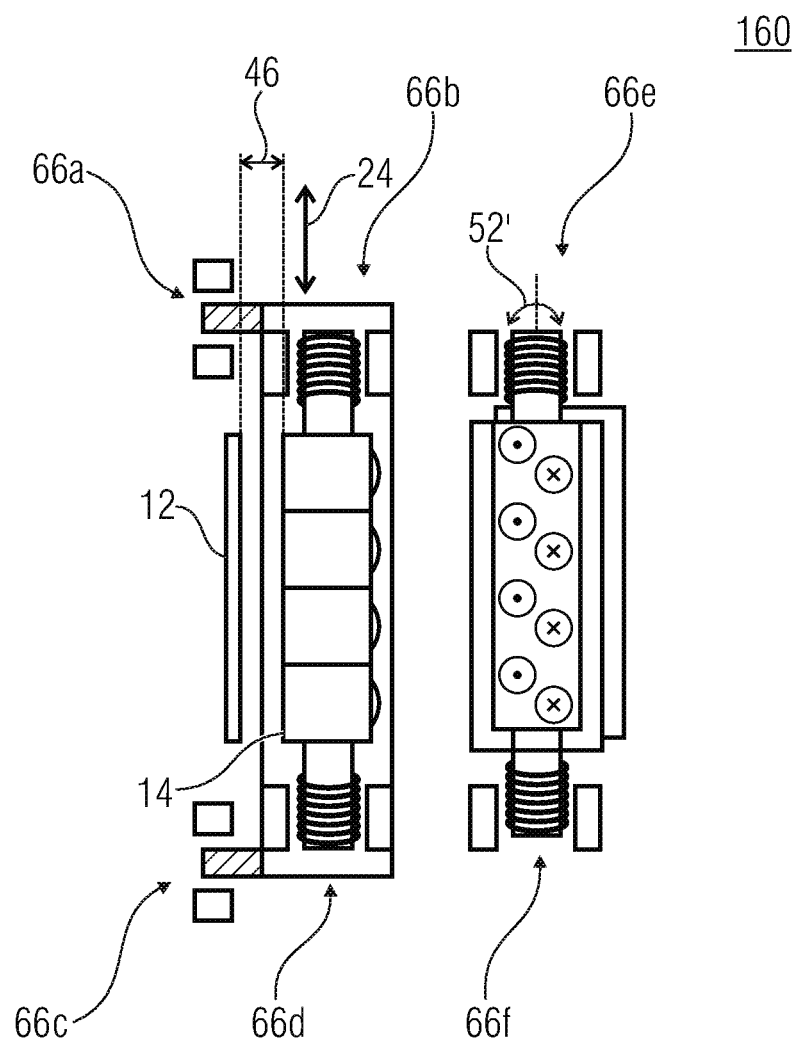
FIG. 16 is a schematic top view of a multi-aperture imaging device according to an embodiment, wherein the actuator means includes voice-coil drives.

FIG. 16 shows a schematic top view of a multi-aperture imaging device 160. The actuator means includes voice-coil drives 66a and 66c that are connected to the single-line array 14 and that are configured to change the distance 46 between the image sensor 12 and the single-line array 14. The multi-aperture imaging device 160 and the actuator means, respectively, includes voice-coil drives 66b and 66d that are connected to the single-line array 14 and that are configured to move the single-line array 14 along the line extension direction 24. Further, the actuator means includes voice-coil drives 66e and 66f that are configured to generate the rotational movement 52'.

In other words, the actuator means can include a voice-coil motor that is configured to change a relative position of the image sensor 12 with respect to the single-line array 14 in a plane parallel to the line extension direction 24 and parallel to the image sensor, for example the voice-coil motors 66b and 66d.

Figure 17A:
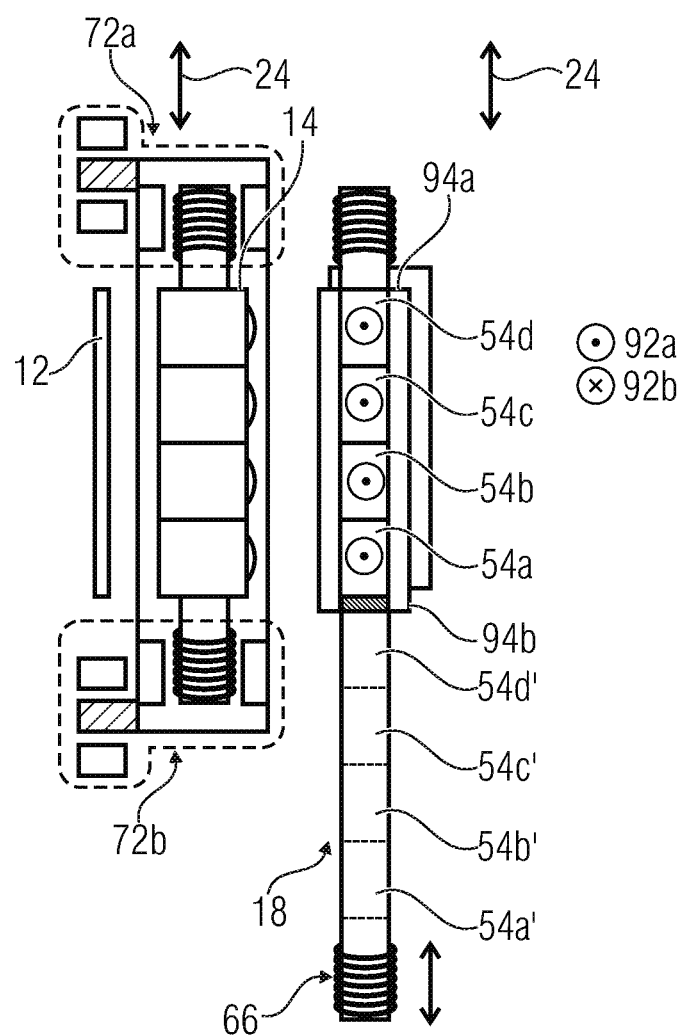
FIG. 17A is a schematic top view of a multi-aperture imaging device according to an embodiment, wherein the beam-deflecting means includes a plurality of beam-deflecting elements.

FIG. 17A shows a schematic top view of a multi-aperture imaging device 170, wherein the beam-deflecting means 18 includes a plurality of beam-deflecting elements 54a-d and 54a'-54d' which can correspond to a number of optical channels multiplied by a number of viewing directions. Based on an arrangement of the deflecting elements 54a-d in front of the single-line array 14, the optical paths of the optical channels can be deflectable along the viewing direction 92a. A voice-coil actuator 66 of the actuator means can be configured to move the beam-deflecting means 18 along or opposite to the line extension direction 24 relative to the single-line array 14.

Figure 17B:
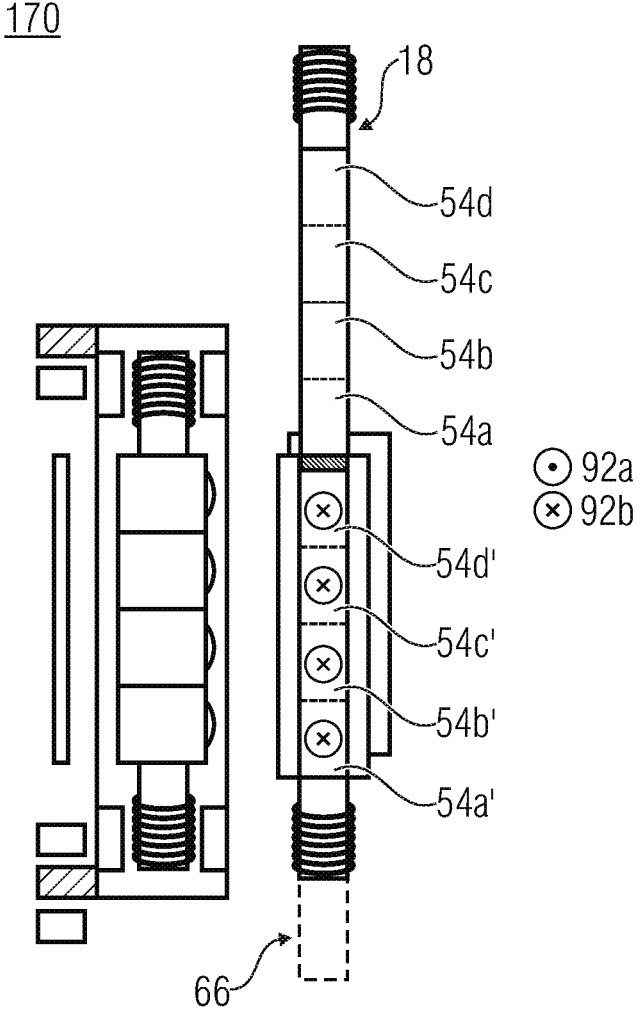
FIG. 17B is a schematic top view of a multi-aperture imaging device of FIG. 17A, wherein the beam-deflecting means comprises a changed position.

FIG. 17B shows a schematic top view of the multi-aperture imaging device 170, wherein the beam-deflecting means 18 comprises a second position, such that the beam-deflecting elements 54a'-54d' deflect the optical paths of the optical channels such that the multi-aperture imaging device 170 comprises the second viewing direction 92b. The beam-deflecting elements 54a'-54d' can have, for example, an inclination or surface curvature differing from the beam-deflecting elements 54a-d.

This means that a viewing direction of the multi-aperture imaging device can be made based on a rotational movement and/or a translational movement of the beam-deflecting means 18, wherein both movements can take place within the virtual cuboid and can keep an installation height of the multi-aperture imaging device 170 low.

Further, the multi-aperture imaging device 170 and its actuator means, respectively, comprises the voice-coil drives 72a and 72b in order to change the distance between image sensor 12 and single-line array 14 and to move the single-line array 14 along the line extension direction 24.

FIG. 18A shows a schematic top view of the multi-aperture imaging device 180 which is modified with respect to the multi-aperture imaging device 170 in that the actuator means comprises the piezoelectric actuators 74a and 74b for changing the distance between the image sensor 12 and the single-line array 14. FIG. 18A shows the beam-deflecting means 18 in the first position.

FIG. 18B shows the beam-deflecting means 18 in the second position, wherein the beam-deflecting means 18 is translationally movable with respect to the configuration in FIG. 18A.

Figure 19A:
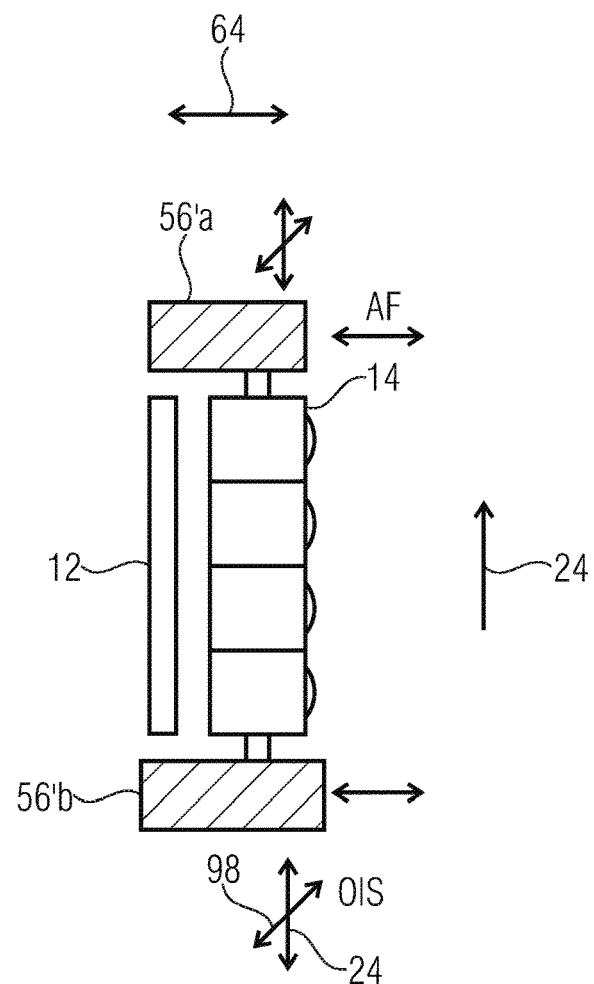
FIG. 19A is a schematic top view of the image sensor and the single-line array according to an embodiment, wherein the single-line array is connected to actuators of the actuator means.
Figure 19B:
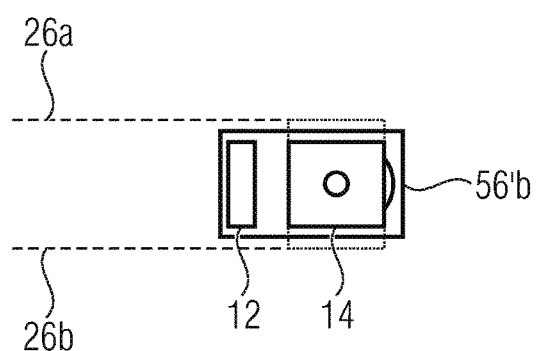
FIG. 19B is a schematic side sectional view of the multi-aperture imaging device of FIG. 19A according to an embodiment, wherein the actuators are arranged completely within an area of two planes.

FIG. 19A shows a schematic top view of the image sensor 12 and the single-line array 14, wherein the single-line array 14 is connected to actuators 56'a and 56'b of the actuator means that are configured to move the single-line array with respect to three spatial axes that are arranged perpendicular to one another. A first spatial axis can be the line extension direction 24. A second spatial axis can be the direction 64. A third spatial axis 98 can span a plane perpendicular to the direction 64a together with the line extension direction 24. The actuators 56'a and 56'b can be configured to move the single-line array 14 along the line extension direction 24 and/or the direction 98 to obtain optical image stabilization (OIS) and/or to move the single-line array 14 along the direction 64 in order to obtain an autofocus function AF. As illustrated in FIG. 19B, the actuator 56'b and/or the actuator 56'a can be arranged completely within planes 26a and 26b. According to embodiments, the actuator 56'a and/or 56'b can also slightly project beyond these planes. Simply put, this arrangement can also be referred to such that the actuators 56'a and 56'b are arranged beside the single-line array 14 when the direction 98 is referred to as height direction.

Figure 20A:
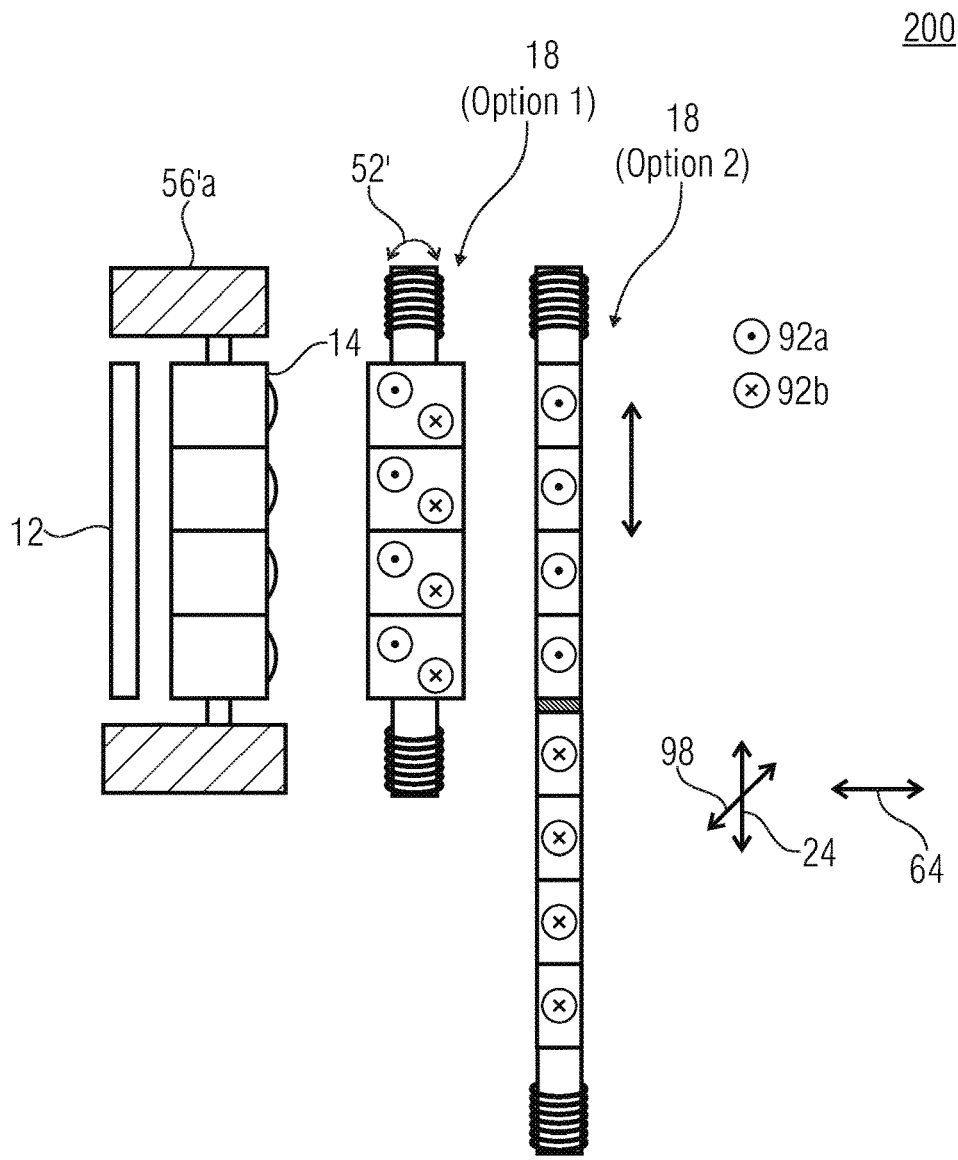
FIG. 20A is a schematic top view of a multi-aperture imaging device according to an embodiment comprising an arrangement of image sensor and single-line array according to FIGS. 19A and 19B.

FIG. 20A shows a schematic top view of a multi-aperture imaging device 200 comprising an arrangement of image sensor 12 and single-line array 14 according to FIGS. 19A and 19B. According to a first option, the multi-aperture imaging device 200 comprises the beam-deflecting means 18 which is configured to be moved based on the rotational movement 52' in order to change between viewing directions 92a and 92b. According to a second option, the multi-aperture imaging device 200 comprises the beam-deflecting means 18 that is configured to be moved along the line extension direction 24 in order to change between viewing directions 92a and 92b as described, for example, in the context of FIGS. 17A and 17B. Alternatively or additionally, the beam-deflecting means 18 according to option 1 and the beam-deflecting means 18 according to option 2 can be arranged in order to obtain, for example, an increased number of viewing directions. The beam-deflecting means 18 according to the first option, for example, can be at least partly transparent in order to direct part of the optical path of the optical channels on the beam-deflecting means 18 according to the second option.

Figure 20B:
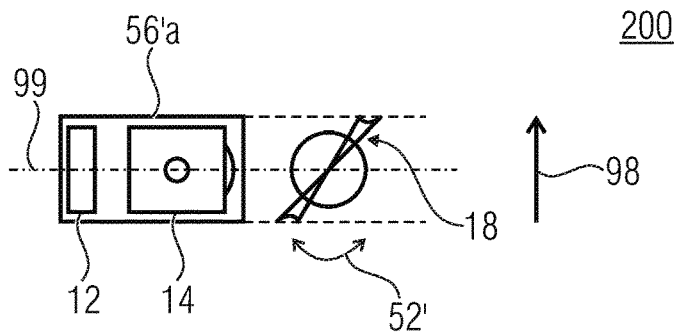
FIG. 20B is a schematic side sectional view of the multi-aperture imaging device of FIG. 20A.

FIG. 20B shows a schematic side sectional view of the multi-aperture imaging device 200. Based on the rotational movement 52', an extension of the multi-aperture imaging device 200 along the direction 98 can be less than according to an arrangement of the actuators 56'a and 56'b according to FIGS. 19A and 19B, since, for example, a relative movement between image sensor 12 and single-line array 14 along the direction 98 can be omitted. This means that the provision of an installation space for this relative movement can be omitted. The beam-deflecting means 18 is configured to deflect the optical path of the optical channels at least in a first viewing direction 92a and a second viewing direction 92b. The actuator means includes one or several actuators 56a' and/or 56'b. The at least one actuator 56'a and/or 56'b is arranged in a plane 99 where the beam-deflecting means 18 is arranged. The plane 99 can be arranged perpendicular to the first viewing direction 92 and/or the second viewing direction 92b. Alternatively or additionally, other actuators described herein can be arranged.

Figure 21A:
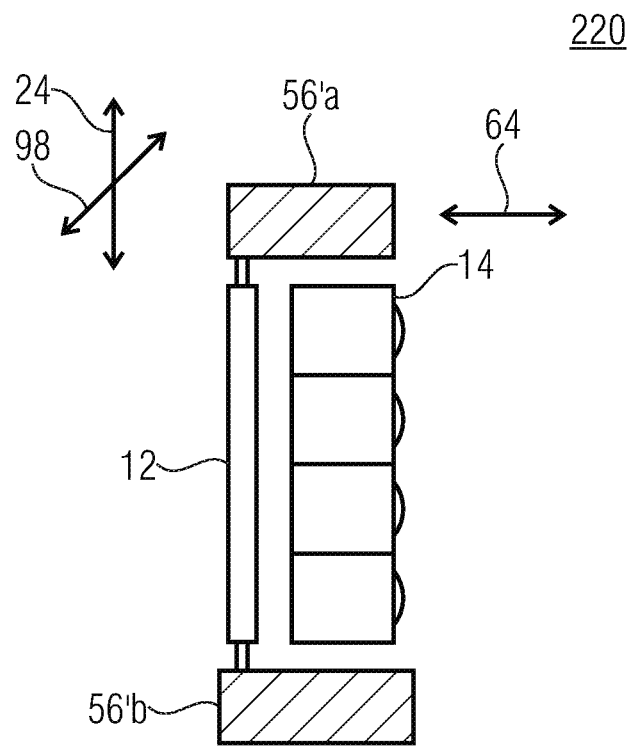
FIG. 21A is a schematic top view of a configuration of the image sensor and the single-line array according to an embodiment where the actuators are connected to the image sensor.

FIG. 21A shows a schematic top view of a configuration of the image sensor 12 and the single-line array 14 which is modified with respect to the configuration according to FIG. 19A such that the actuator 56'a and the actuator 56'b can be connected to the image sensor 12 in order to generate the relative movement along directions 24, 64 and/or 98 between the image sensor 12 and the single-line array 14.

Figure 21B:
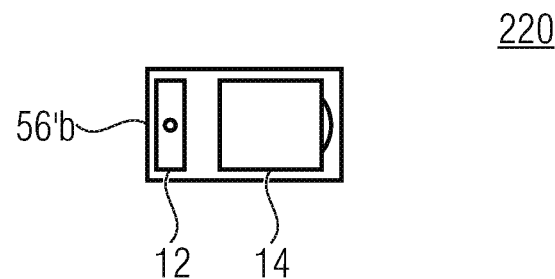
FIG. 21B is a schematic side sectional view of the configuration according to FIG. 21A according to an embodiment.

FIG. 21B shows a schematic side sectional view of the configuration according to FIG. 21A which is the same as or comparable to the configuration according to FIG. 19B, wherein the actuator 56'b is connected to the image sensor 12.

Figure 22A:
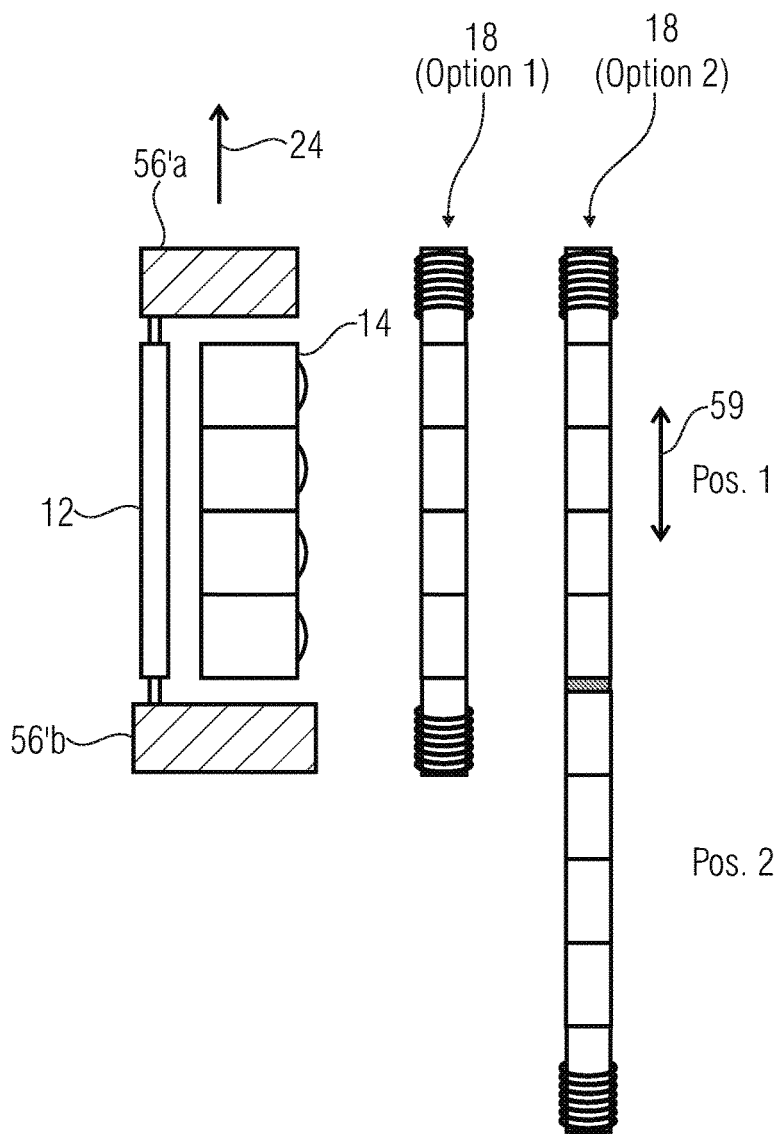
FIG. 22A is a schematic top view of a multi-aperture imaging device according to an embodiment, wherein the actuators of the actuator means are connected to the image sensor.

FIG. 22A shows a schematic top view of a multi-aperture imaging device 220 which is modified with respect to the multi-aperture imaging device 200 in that the actuators 56'a and 56'b of the actuator means are connected to the image sensor 12 as described in the context of FIG. 21A. The beam-deflecting means 18 can be switched between a first positon Pos1 and a second positon Pos2 by a translational movement 59 which runs essentially parallel to the line extension direction 24.

Figure 22B:
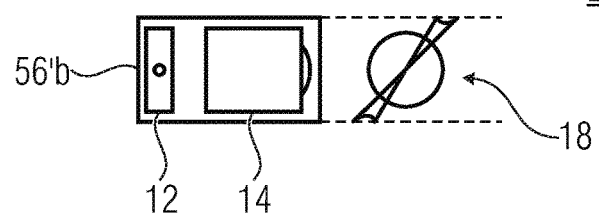
FIG. 22B is a schematic side sectional view of the multi-aperture imaging device according to FIG. 20B, wherein the actuators are connected to the image sensor, according to an embodiment.

FIG. 22B shows a schematic side sectional view of the multi-aperture imaging device 220, which is comparable to the side sectional view according to FIG. 20B, wherein the actuators 56'a and/or 56'b can be connected to the image sensor 12.

Figure 23A:
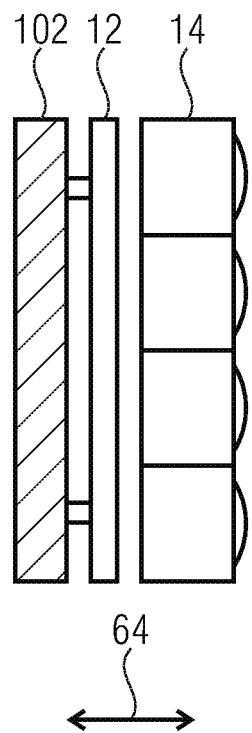
FIG. 23A is a schematic top view of a configuration of the image sensor and the single-line array according to an embodiment, wherein an actuator is arranged on a side of the image sensor facing away from the single-line array.

FIG. 23A shows a schematic top view of a configuration including the image sensor 12 and the single-line array 14, wherein one actuator 102 of the actuator means of a multi-aperture imaging device is arranged on a side of the image sensor 12 facing away from the single-line array 14 and is connected to the image sensor 12. The actuator 102 is configured to move the image sensor 12 along the direction 64 in order to change a focus of the optical channels. Further, the actuator 102 can allow movement along directions 98 and/or 24, for example to obtain optical image stabilization.

The actuator 102 can be implemented, for example, as a pneumatic, hydraulic, piezoelectric actuator, DC motor, step motor, thermal actuator, electrostatic actuator, electrostrictive and/or magnetostrictive actuator or drive, alternating current motor and/or voice-coil drive. The actuator 102 can, for example, be a piezoelectrically or thermally actuated bending actuator. Simply put, the actuator 102 is behind the image sensor 12 in order to move the same.

Figure 23B:
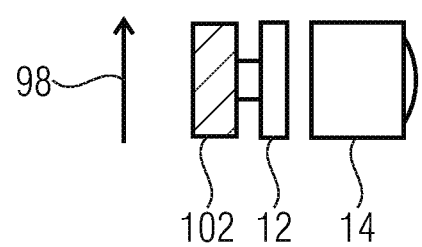
FIG. 23B is a schematic side sectional view of the configuration of FIG. 23A.

FIG. 23B shows a schematic side sectional view of the configuration of FIG. 23A. An installation height of the configuration is not or only slightly increased by an arrangement of the actuator 102.

Figure 24A:
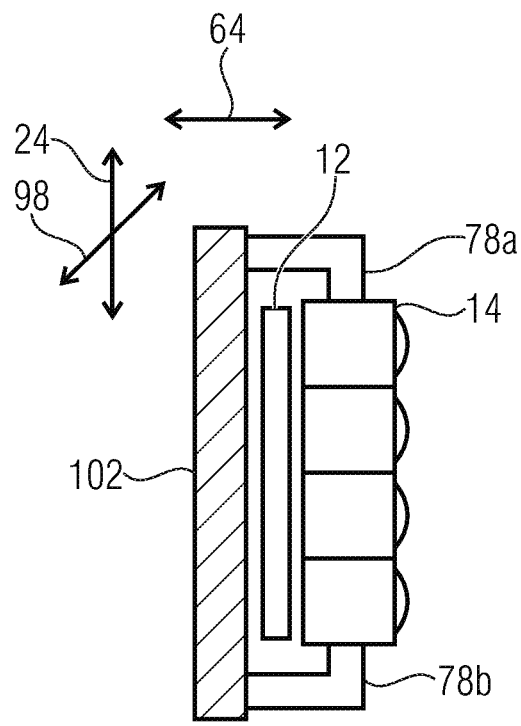
FIG. 24A is a schematic top view of the image sensor and the single-line array according to an embodiment, wherein the actuator is connected to the single-line array by means of a mechanical connection.

FIG. 24A shows a schematic top view of the image sensor 12 and the single-line array 14, wherein a configuration is modified with respect to the view in FIG. 23A in that the actuator 102 is connected to the single-line array 14 by means of the mechanical connections 78a and 78b and is configured to move the single-line array 14 with respect to the image sensor 12. Further, the actuator 102 can be configured to move the single-line array 14 along the axes 24, 98 and/or 64 with respect to the image sensor 12.

Figure 24B:
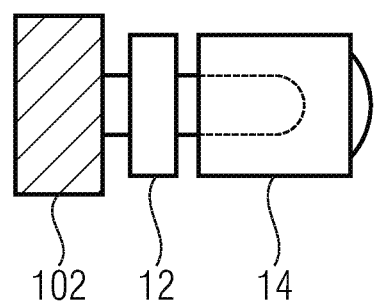
FIG. 24B is a schematic side sectional view of the configuration of FIG. 24A.

FIG. 24B shows a schematic side sectional view of the configuration of FIG. 24A.

While some of the above-described embodiments relate to an arrangement or configuration of image sensor 12 and single-line array 14, the same can be easily be arranged adjacent to beam-deflecting means, such that these configurations can be easily transferred to multi-aperture imaging devices. According to embodiments, the described configurations of image sensor and single-line array describe components of a multi-aperture imaging device.

Figure 25:
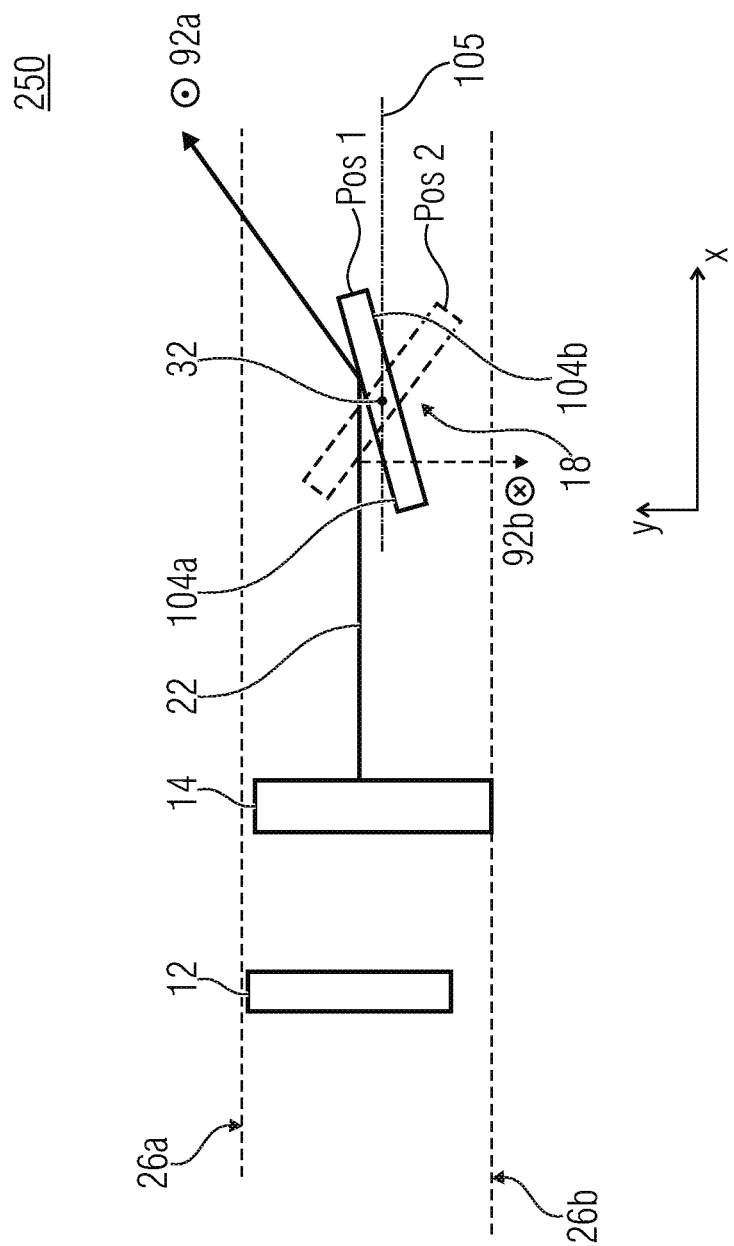
FIG. 25 is a schematic side sectional view of a multi-aperture imaging device with a pivoted beam-deflecting means according to an embodiment.

FIG. 25 shows a schematic side sectional view of a multi-aperture imaging device 250 including the image sensor 12, the single-line array 14 and the beam-deflecting means 18 pivoted around the axis of rotation 32.

The beam-deflecting means 18 can be switchable between two positions Pos1 and Pos2 in order to deflect the optical paths 22 of the optical channels in a first viewing direction 92a and/or a second viewing direction 92b. The positions can, for example, be stable positions such that the beam-deflecting means 18 is switchable in a bi-stable manner. The possibly stable positions can be superimposed by rotational movement for optical image stabilization. The viewing directions 92a and 92b can be arranged perpendicular, anti-parallel or having a different angle to one another and can, for example, be influenced by an orientation of the beam-deflecting means 18 in the respective position. An intermediate position or central position 105 of the beam-deflecting means 18 can, for example, include a horizontal or perpendicular orientation of the main sides 104a and/or 104b with respect to the single-line array 14 or the image sensor 12 or main sides thereof. It is advantageous that switching between the first position Pos1 and the second position Pos2 via the central position 105 allows a small installation height of the multi-aperture imaging device 250 and the usage in at least two viewing directions. A dimension of main sides 104a and/104b perpendicular to a thickness direction, for example, along the x-direction can be of any size, i.e. almost independent without increasing an installation height of the multi-aperture imaging device 250.

Figure 26:
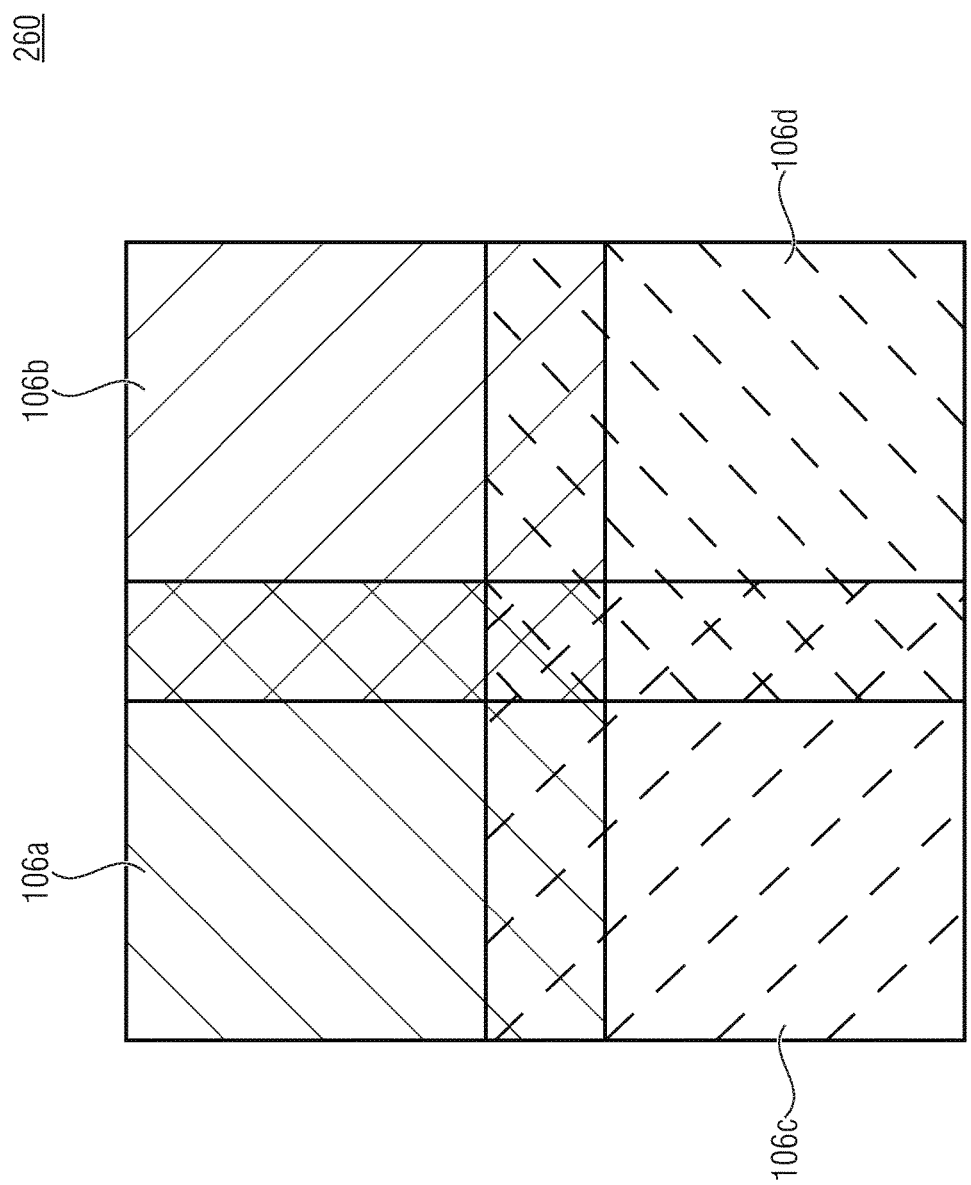
FIG. 26 is a schematic illustration of a total field of view as it can be captured with the embodiments described herein.

FIG. 26 shows a schematic illustration of a total field of view (object area) 260 as it can be captured, for example with a multi-aperture imaging device described herein. The optical paths of the optical channels of the multi-aperture imaging devices can be directed on differing partial fields of view (partial areas of an object area) 106a-d, wherein one partial field of view 106a-d can be allocated to each optical channel. The partial fields of view 106a-d can overlap in order to allow joining of individual partial images to a total image. If the multi-aperture imaging device has one of four different numbers of optical channels, the total field of view 260 can have one of four different numbers of partial fields of view. Alternatively or additionally, at least one partial field of view 106a-d can be captured by a second or higher number of optical channels in order to obtain a so-called super-resolution of the generated image. A number of optical channels and/or a number of partial fields of view is, for example, arbitrary and can have a number of at least two, at least three, at least four, at least ten, at least 20 or an even higher value.

Figure 27:
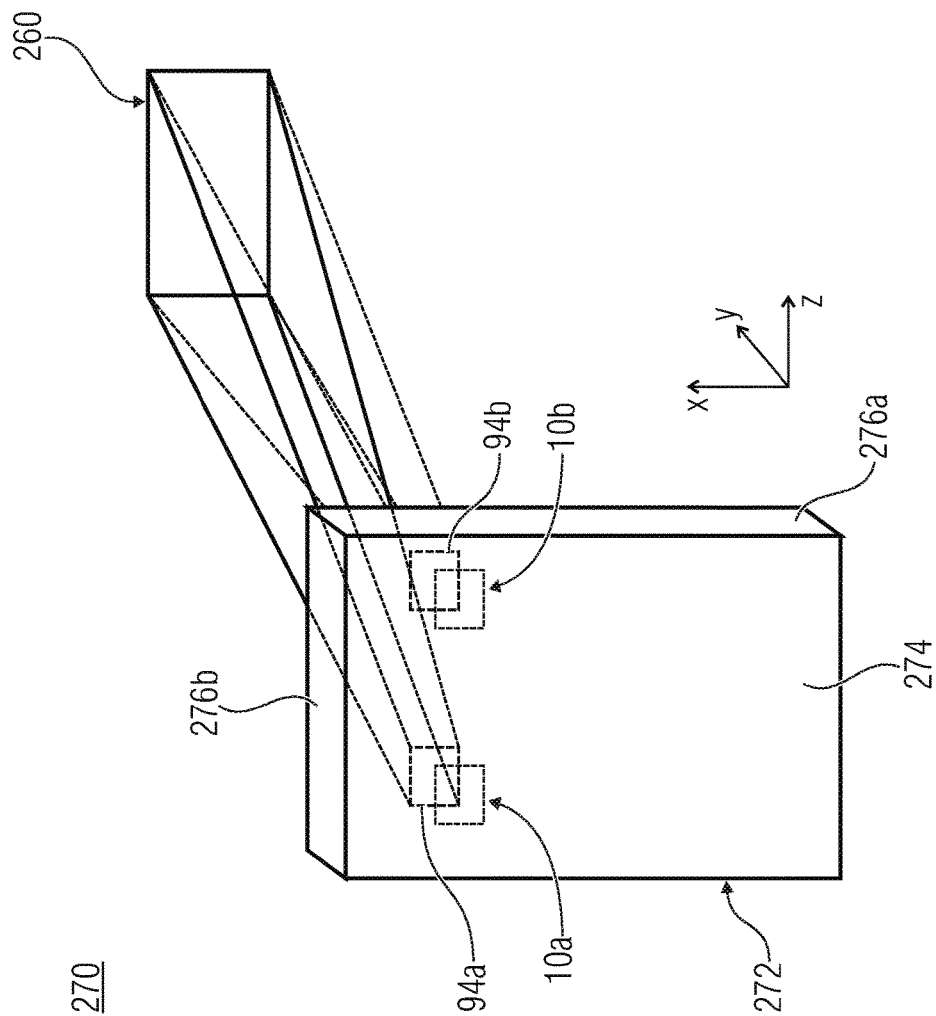
FIG. 27 is a schematic perspective view of an imaging system according to an embodiment.

FIG. 27 shows a schematic perspective view of an imaging system 270 comprising a first multi-aperture imaging device 10a and a second multi-aperture imaging device 10b, which are configured to each capture the total field of view 260 (object area). This means that the object area can be captured in a stereoscopic manner.

According to further embodiments, at least one of the multi-aperture imaging devices can be formed as multi-aperture imaging device 10, 40, 140, 150, 160, 170, 180, 200, 220 or 250. According to further embodiments, the imaging system 270 can include further multi-aperture imaging devices according to embodiments described herein in order to image the object area 260 or a differing object area.

As stated in the context of embodiments described herein, the multi-aperture imaging devices 10a or 10b can be configured to change a viewing direction of the respective multi-aperture imaging device and hence the imaging system 270 in order to change a position of the total field of view 260 in space.

The imaging system 270 can be formed as portable system, in particular as mobile communication means. The portable system 270 can, for example, be a mobile phone, such as a smart phone, a mobile computer such as a tablet computer and/or a mobile music player.

The imaging system 270 can comprise a housing 272. The housing 272 can be formed in a flat manner. This means the housing 272 can have an extension along the three spatial axes x, y and z. Main sides 274 of the housing 272 can be arranged, for example, in an x/z-plane or parallel thereto. Secondary sides 276a and 276b can, for example, connect the main sides 274 to one another. A flat housing can be considered such that the same includes a first and a second dimension of main sides 274 (for example, along the x-direction and along the z-direction) which have, with regard to a third dimension, for example along the y-direction, at least a threefold, at least a fivefold, at least a sevenfold, or even higher dimension. For example, a flat housing can have a width including three-times the housing thickness and/or a height including four-times the housing thickness.

Figure 28:
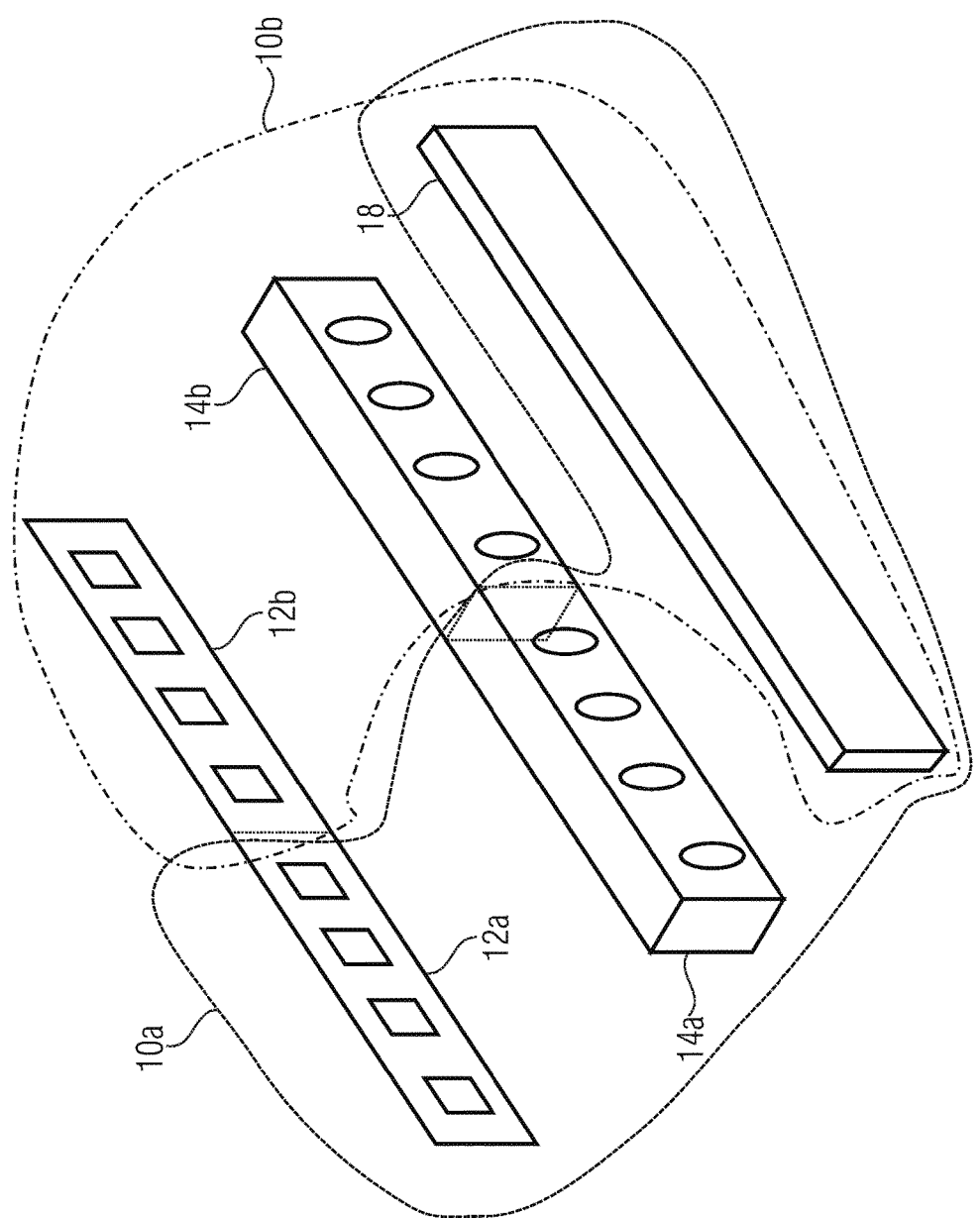
FIG. 28 is a schematic structure including a first multi-aperture imaging device and a second multi-aperture imaging device with a common image sensor.

FIG. 28 shows a schematic structure including a first multi-aperture imaging device 10a and a second multi-aperture imaging device 10b as it can be arranged, for example, in the imaging system 270. The single-line arrays 14a and 14b form a common line. The image sensors 12a and 12b can be mounted on a common substrate or on a common circuit carrier such as a common board or a common flex board. Alternatively, the image sensors 12a and 12b can also include differing substrates. Different mixtures of these alternatives are also possible, such as multi-aperture imaging devices including a common image sensor, a common array and/or a common beam-deflecting means 18 as well as further multi-aperture imaging devices including separate components. It is an advantage of a common image sensor, a common single-line array and/or a common beam-deflecting means that a movement of a respective component can be obtained with high precision by controlling a small amount of actuators, and synchronization between actuators can be reduced or avoided. Further, high thermal stability can be obtained. Alternatively or additionally, different and/or differing multi-aperture imaging devices 10, 40, 140, 150, 160, 170, 180, 200, 220 and/or 250 can also comprise a common array, a common image sensor and/or beam-deflecting means.

A method for producing a multi-aperture imaging device can include providing an image sensor, arranging a single-line array of juxtaposed optical channels, such that each optical channel includes optics for projecting a partial area of an object area on an image sensor area of the image sensor, arranging a beam-deflecting structure for deflecting an optical path of the optical channels and arranging actuator means for generating a relative movement between the image sensor, the single-line array and the beam-deflecting means. The actuator means can be arranged such that the same is arranged at least partly between two planes that are spanned by sides of a cuboid, wherein the sides of the cuboid are oriented parallel to one another as well as to a line extension direction of the single-line array and part of the optical path of the optical channels between the image sensor and the beam-deflecting means, wherein the volume of the cuboid is at a minimum and still includes the image sensor, single-line array and the beam-deflecting means.

In other words, the installation height of the multi-aperture imaging systems or apparatuses with linear channel arrangement can be limited towards the bottom by a diameter of the lenses (optics). Multi-aperture imaging systems with linear channel arrangement can aim at an installation height that is as low as possible. In order to not increase the installation height of the camera structure any further, the means for realizing relative movements between image sensor(s), imaging optics and possibly existing beam deflecting mirrors can be placed beside, before and/or behind the imaging module (image sensor and single-line array) but not above and/or below the same.

The relative movement can be performed in a translational and/or rotational manner, analogously or stable along two or multiple directions and can be used for realizing focusing and optical image stabilization functions. The movement of the mirror (beam-deflecting means) can be performed based on pneumatic, hydraulic, piezoelectric actuators; DC motors; step motors; thermal actuators; electrostatic actuators; electrostrictive and/or magnetostrictive actuators or drives.

Actuators of the actuator means described herein for using autofocus and/or optical image stabilization can be controlled independently of one another (individually) in a synchronous manner or even identically to one another. This applies in particular also for a multiple arrangement of multi-aperture imaging devices in a housing, such as in a multi-aperture imaging system.

By arranging the described driving, guiding and holding elements for realizing relative movements between single components of the multi-aperture camera structures for realizing relative movements without increasing the installation height that is essentially determined by a diameter of the optics, flat cameras can be arranged in flat housings, such that the flat housings can be further miniaturized.

Embodiments described herein describe multi-aperture imaging systems with linear channel arrangement and smallest installation size.

Some of the embodiments described herein are related to an arrangement of components for generating movements based on the voice-coil principle for realizing focusing and optical stabilization functions in multi-aperture imaging systems with linear arrangement of the imaging channels.

Voice-coil motors are frequently or most frequently used drives and are adapted to single aperture principles with their structure and can be optimized for them.

For realizing the focus function, advantageously, the imaging module can be moveable along the optical axis of the optical channels by using a voice-coil drive, wherein the image sensor(s) can be stationary or vice versa. For realizing an optical image stabilization function, for example or advantageously, the imaging module can be moveable perpendicularly to the optical axes of the optical channels in two dimensions relative to the stationary image sensor(s) by using voice-coil drives or vice versa. Possibly desirable or necessitated restoring forces can be generated by a mechanical, pneumatic and/or hydraulic spring.

When using a beam-deflecting mirror, alternatively, the function of optical image stabilization can be obtained. This can be performed by a one-dimensional change of the viewing direction by changing the orientation of the mirror with respect to the optical axis of the imaging channels. The pivoted mirror can be brought into a different orientation, wherein the axis of rotation of the mirror can run perpendicularly or almost perpendicularly to the optical axes of the imaging channels. For adapting the viewing direction perpendicular to the above-described viewing direction, image sensor and/or array objective can be moved laterally to one another. When combining both movements, two-dimensional optical image stabilization can be obtained. The described solutions for adapting the focusing and/or optical image stabilization can be combined. It is an advantage that desirable or necessitated driving, guiding and/or holding elements for realizing relative movements by using voice-coil drives between single components of the multi-aperture camera structures can be obtained without increasing the installation height that is essentially determined by the diameter of the lenses.

According to further embodiments, an arrangement of components for generating movements based on piezoelectric bending converters and/or thermal bender arrangements for realizing focusing and optical image stabilization functions in multi-aperture imaging systems with linear arrangement of the imaging channels is described.

Piezoelectric and thermal bending elements can have the advantages of low switching times and cost-effective production. For providing sufficiently large actuator travels, the elements can be formed in an elongated manner, such that their usage in conventional single aperture cameras results in a great enlargement of the installation space and is hence not used. On the other hand, multi-aperture imaging systems with linear channel arrangement can have a different aspect ratio of the installation space compared to conventional single-aperture objectives. Here, the installation height of the multi-aperture imaging systems with linear channel arrangement can be limited towards the bottom by the diameter of the lenses. Multi-aperture imaging systems with linear channel arrangement can aim at an installation height that is as low as possible. For realizing the focusing function, advantageously, the imaging module can be moved along the optical axes of the channels by using one or several piezoelectric or thermal bending converters, wherein the image sensor(s) can be stationary or vice versa. This means, alternatively, the image sensor(s) can be moved wherein the imaging module is stationary. Both concepts can be combined. Here, systems can be differentiated by using one or two bending converters. The amended aspect ratio of the installation space and/or the structure can allow the usage of piezoelectric and/or thermal bending converters without obtaining a significant enlargement of the structure. Further, advantageously, no enlargement of the installation height may be obtained.

For realizing the optical image stabilization function, advantageously, the imaging module can be moved perpendicularly to the optical channels in two dimensions relative to the stationary image sensor(s) by using piezoelectric and/or thermal bending converters. Possibly desirable or necessitated restoring forces can be generated by a mechanical, pneumatic and/or hydraulic spring. Alternatively or additionally, the image sensor(s) can be moved, wherein the imaging module can be stationary. When using a beam deflecting mirror, alternatively, the optical image stabilization function can be obtained. This can be obtained by a one-dimensional change of the viewing direction, which can be obtained by changing the orientation of the mirror with respect to the optical axis of the imaging channels by bringing the pivoted mirror into a different orientation, wherein the axis of rotation of the mirror can run perpendicular or almost perpendicular to the optical axes of the imaging channels. For adapting the viewing direction perpendicular to the above described one, image sensor and/or array objective can be moved laterally to one another. When combining both movements, two-dimensional optical image stabilization can be obtained. The described solution for adaptation of focusing and/or optical image stabilization can be combined with one another.

This allows the usage of fast and/or cost effective drives which is not possible or desirable in conventional structures due to geometrical boundary conditions.

It has already been noted above that the optical paths or optical axes can be directed in different directions starting from the beam-deflecting direction. This can be obtained in that the optical paths are directed, during deflection at the beam-deflecting means and/or by the optics, in a manner deviating from parallelism. The optical paths or optical axes can deviate from parallelism before or without beam deflection. Below, this circumstance will be described such that the channels can be provided with some sort of pre-divergence. With this pre-divergence of the optical axes, it would be possible, for example, that not all facet inclinations of facets of the beam-deflecting means differ from one another, but that some groups of channels, for example, have the facets with the same inclination or are directed to the same. The latter can be formed integrally or continuously converging, virtually as one facet which is allocated to this group of channels adjacent in a line extension direction. The divergence of the optical axes of these channels could then originate from the divergence of these optical axes as it is obtained by a lateral offset between optical centers of the optics of the optical channels and image sensor areas of the channels. The pre-divergence could be limited, for example, to one plane. Before or without beam deflection, for example, the optical axes could run in a common plane but divergent within the same, and the facets effect merely additional divergence in the other transversal plane, i.e. all of them are inclined parallel to the line extension direction and with respect to one another, only differing from the above-mentioned common plane of the optical axes, wherein again several facets can have the same inclination or can be allocated together to a group of channels whose optical axes differ, for example, already in the above-mentioned common plane of the optical axes in pairs, before or without beam deflection. Simply put, the optics can allow (pre-) divergence of the optical paths along a first (image) direction and the beam-deflecting means a divergence of the optical paths along a second (image) direction.

The mentioned, possibly existing, pre-divergence can be obtained, for example, in that the optical centers of the objects lie on a straight line along the line extension direction, while the centers of the image sensor areas are arranged deviating from the projection of the optical centers along the normal of the plane of the image sensor areas on points of a straight line in the image sensor plane, such as at points which deviate from the points on the above-mentioned straight line in the image sensor plane in a channel-individual manner along the line extension direction and/or along the direction perpendicular to both the line extension direction and the image sensor normal. Alternatively, pre-divergence can be obtained in that the centers of the image sensors lie on a straight line along the line extension direction, while the centers of the optics are arranged deviating from the projection of the optical centers of the image sensors along the normal of the plane of the optical centers of the optics on points on a straight line in the optics center plane, such as at points deviating from the points on the above-mentioned straight line in the optic center plane in a channel-individual manner along the line extension direction and/or along the direction perpendicular to both the line extension direction and the normal of the optic center plane. It is advantageous when the above-mentioned channel-individual deviation from the respective projection merely runs in line extension direction, i.e. the optical axes merely reside within a common plane and are provided with pre-divergence. Both optical centers and image sensor area centers are then each on a straight line parallel to the line extension direction but with different intermediate distances. A lateral offset between lenses and image sensors in perpendicular lateral direction to the line extension direction would thus result in an increase of the installation height. A pure in-plane offset in the line extension direction does not change the installation height, but possibly less facets result and/or the facets have only a tilting in an angular orientation which simplifies the structure. Thus, for example, respectively adjacent optical channels can have optical axes running in the common plane, each squinting with respect to one another, i.e. provided with pre-divergence. A facet can be arranged with respect to a group of optical channels, can be inclined merely in one direction and can be parallel to the line extension direction.

Further, it could be provided that some optical channels are allocated to the same partial field of view, such as for the purpose of super-resolution or of increasing the resolution by which the respective partial field of view is sampled by these channels. The optical channels within such a group would then be parallel, for example before the beam deflection parallel and would be deflected by a facet on a partial field of view. Advantageously, pixel images of the image sensor of a channel of a group would be in intermediate positions between images of the pixels of the image sensor of a different channel of this group.

Another option could be, for example, even without super-resolution purposes, but merely for stereoscopy purposes, an implementation where a group of immediately adjacent channels completely cover the total field of view in the line extension direction by their partial fields of view and that a further group of immediately adjacent channels completely cover the total field of view on their part.

Thus, the above embodiments can be implemented in the form of a multi-aperture imaging device and/or an imaging system including such a multi-aperture imaging device, with a single-line channel arrangement, wherein each channel transmits a partial field of view of a total field of view and the partial fields of view partly overlap. A structure having several such multi-aperture imaging devices for stereo, trio, quatro, etc. structures, for 3D image capturing, is possible. The plurality of modules can be implemented as continuous line. The continuous line could use identical actuators and a common beam-deflecting element. One or several amplifying substrates possibly existing in the optical path could then extend across the entire line which can form a stereo, trio, quatro structure. Methods of super-resolution can be used, wherein several channels image the same partial image areas. The optical axes can also run divergently without beam-deflecting device such that fewer facets are necessitated on the beam-deflecting unit. Then, the facets advantageously only have one angular component. The image sensor can be integrally formed, can have only one contiguous pixel matrix or several interrupted ones. The image sensor can be a combination of several partial sensors which are arranged beside one another, for example on a printed circuit board. An auto-focus drive can be configured such that the beam-deflecting element is moved synchronously with the optics or is stationary.

While some aspects have been described in the context of an apparatus, it is obvious that these aspects also represent a description of the respective method, such that a block or member of an apparatus can also be considered as a respective method step or as a feature of a method step. Analogously, aspects that have been described in the context of or as a method step also represent a description of a respective block or detail or feature of a respective apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Multi-aperture imaging device, comprising:
   an image sensor;
   a single-line array of juxtaposed optical channels, wherein each optical channel comprises optics for projecting a partial area of an object area on an image sensor area of the image sensor, wherein the single-line array comprises a carrier through which the optical channels pass;
   beam deflector for deflecting an optical path of the optical channels; and
   actuator unit for generating a relative movement between the image sensor, the single-line array and the beam deflector,
   wherein the actuator unit is arranged such that the same is arranged at least partly between two planes that are spanned by sides of a cuboid, wherein the sides of the cuboid are oriented parallel to one another as well as to a line extension direction of the single-line array and part of the optical path of the optical channels between the image sensor and the beam deflector and its volume is at a minimum and still comprises the image sensor, the single-line array and the beam deflector; and
   wherein the multi-aperture imaging device comprises a thickness direction that is arranged normal to the two planes, wherein the actuator unit comprises a dimension parallel to the thickness direction and a portion of at most 50% of the dimension projects beyond the two planes, starting from an area between the two planes.

2. Multi-aperture imaging device according to claim 1, wherein the optics of the optical channels are arranged within or adjacent to transparent areas of the carrier and/or at end areas thereof, and/or the carrier is formed in a transparent manner and the optics are arranged on a surface of the carrier, which influence the projection of a respective partial field of view of the total field of view on a respective image sensor area of the image sensor.

3. Multi-aperture imaging device according to claim 1, wherein the actuator unit comprises a piezoelectric actuator that is coupled to the image sensor or the array.

4. Multi-aperture imaging device according to claim 3, wherein the piezoelectric actuator is connected to the image sensor or the array via a mechanical deflector, wherein the mechanical deflector is arranged between the planes.

5. Multi-aperture imaging device according to claim 3, wherein the piezoelectric actuator is a bending converter.

6. Multi-aperture imaging device according to claim 1, wherein the actuator unit comprises a voice-coil drive that is connected to the image sensor or the array.

7. Multi-aperture imaging device according to claim 1, wherein the relative movement based on a translational movement between the image sensor and the array allows a change of a focal position of the multi-aperture imaging device.

8. Multi-aperture imaging device according to claim 1, wherein the relative movement based on a translational movement between the image sensor and the array parallel or antiparallel to a line extension direction of the array and/or a lateral shift of the beam deflector and/or a rotation of the beam deflector around an axis of rotation enables optical image stabilization.

9. Multi-aperture imaging device according to claim 1, wherein the relative movement based on a lateral shift of the beam deflector and/or a rotation of the beam deflector around an axis of rotation enables switching between viewing directions of the multi-aperture imaging device.

10. Multi-aperture imaging device according to claim 1, wherein actuators of the actuator unit are arranged completely between the two planes.

11. Multi-aperture imaging device according to claim 1, wherein the beam deflector is configured to deflect the optical channels at a first position of the beam deflector such that the multi-aperture imaging device comprises a first viewing direction, and wherein in the multi-aperture imaging device at a second position of the beam deflector the optical paths of the optical channels are deflected such that the multi-aperture imaging device comprises a second viewing direction.

12. Multi-aperture imaging device according to claim 1, wherein the actuator unit for generating the relative movement is arranged on a side of the image sensor facing away from the single-line array.

13. Multi-aperture imaging device according to claim 12, wherein the actuator unit projects along a thickness direction perpendicular to the line extension direction by at the most 50% of the dimension of the actuator unit along the thickness direction from an area between the two planes beyond a first or second plane of the two planes.

14. Multi-aperture imaging device according to claim 1, wherein the beam deflector is configured to deflect the optical path of the optical channels at least in a first and a second viewing direction, wherein the actuator unit comprises at least one actuator and wherein the at least one actuator is arranged in a plane of the beam deflector which is arranged perpendicular to the first or second viewing direction.

15. Multi-aperture imaging device according to claim 1, wherein the relative movement comprises a change of a distance between the image sensor and the single-line array along a beam direction parallel to an optical path through the optical channels between the single-line array and the beam deflector or a change of a distance between the single-line array and the beam deflector along the beam direction.

16. Multi-aperture imaging device according to claim 1, wherein the relative movement comprises a change of a distance between the image sensor and the single-line array along a beam direction parallel to an optical path through the optical channels between the single-line array and the beam deflector by shifting the single-line array and maintaining a distance between the single-line array and the beam deflector along the beam direction.

17. Multi-aperture imaging device according to claim 1, wherein the relative movement comprises a translational movement of the image sensor, the single-line array or the beam deflector for optical image stabilization, wherein the translational movement runs parallel to a first image axis or a second image axis of an image captured by the multi-aperture imaging device.

18. Multi-aperture imaging device according to claim 1, wherein the relative movement comprises a rotational movement of the beam deflector around an axis parallel to the line extension direction of the single-line array or a translational movement of the beam deflector along the axis parallel to the line extension direction, wherein the translational movement can be performed between a first position and a second position between which the beam deflector is translationally movable.

19. Multi-aperture imaging device according to claim 1, wherein the image sensor or the beam deflector is arranged between a first actuator of the actuator unit and the single-line array, wherein the first actuator is configured to change a distance between the image sensor and the single-line array.

20. Multi-aperture imaging device according to claim 19, wherein the first actuator is a bending actuator that is configured to move, during actuation, an area of the actuator along a beam direction parallel to an optical path through the optical channels.

21. Multi-aperture imaging device according to claim 20, wherein the actuator unit comprises a second actuator that is formed as bending actuator, wherein the second actuator is configured to change a distance between the image sensor and the single-line array and to move, during actuation, an area of the actuator along a beam direction parallel to an optical path through the optical channels, wherein the first and second actuators are connected to different areas of the single-line array along the line extension direction.

22. Multi-aperture imaging device according to claim 1, wherein the actuator unit comprises a first voice-coil motor that is configured to change a distance between the image sensor and the single-line array.

23. Multi-aperture imaging device according to claim 22, wherein the actuator unit is configured to change the distance between the image sensor and the single-line array and to maintain a distance between the single-line array and the beam deflector along a beam direction.

24. Multi-aperture imaging device according to claim 1, wherein the actuator unit comprises a voice-coil motor that is configured to change a relative position of image sensor with respect to the single-line array in a plane perpendicular to a line extension direction of the single-line array and parallel to the image sensor.

25. Multi-aperture imaging device according to claim 1, which is arranged in a flat housing, wherein at least a first extension and a second extension of the housing along a first housing direction and a second housing direction comprise at least a threefold dimension compared to a third extension of the housing along a third housing direction.

26. Multi-aperture imaging device according to claim 1, wherein the actuator unit comprises an actuator that is configured to move the single-line array along a line extension direction of the single-line array.

27. Multi-aperture imaging device according to claim 1, wherein the actuator unit comprises an actuator that is configured to place the beam deflector in a rotational movement of the beam deflector around an axis parallel to the line extension direction of the single-line array.

28. Imaging system with a first multi-aperture imaging device according to claim 1 and a second multi-aperture imaging device according to claim 1, wherein the imaging system is configured to capture an object area at least stereoscopically.

29. Imaging system according to claim 28, which is a portable system.

30. Method for producing a multi-aperture imaging device, comprising:
proviing an image sensor;
arranging a single-line array of juxtaposed optical channels, such that each optical channel comprises optics for projecting a partial area of an object area on an image sensor area of the image sensor, such that the single-line array comprises a carrier through which the optical channels pass;
arranging beam deflector for deflecting an optical path of the optical channels;
arranging an actuator unit for generating a relative movement between the image sensor, the single-line array and the beam deflector,
wherein the actuator unit is arranged such that the same is arranged at least partly between two planes that are spanned by sides of a cuboid, wherein the sides of the cuboid are oriented parallel to one another as well as to a line extension direction of the single-line array and part of the optical path of the optical channels between the image sensor and the beam deflector and its volume is at a minimum and still comprises the image sensor, the single-line array and the beam deflector;
wherein the multi-aperture imaging device comprises a thickness direction that is arranged normal to the two planes, wherein the actuator unit comprises a dimension parallel to the thickness direction and a portion of at most 50% of the dimension projects beyond the two planes, starting from an area between the two planes.

* * * * *